(12) United States Patent
Mihali

(10) Patent No.: US 12,159,354 B2
(45) Date of Patent: *Dec. 3, 2024

(54) LIGHT FIELD DISPLAY AND VIBRATING LIGHT FIELD SHAPING LAYER AND VISION TESTING AND/OR CORRECTION DEVICE

(71) Applicant: EVOLUTION OPTIKS LIMITED, Christ Church (BB)

(72) Inventor: Raul Mihali, Westport, CT (US)

(73) Assignee: EVOLUTION OPTIKS LIMITED, Christ Church (BB)

( * ) Notice: Subject to any disclaimer, the term of this patent is extended or adjusted under 35 U.S.C. 154(b) by 41 days.

This patent is subject to a terminal disclaimer.

(21) Appl. No.: 17/594,665

(22) PCT Filed: Apr. 23, 2020

(86) PCT No.: PCT/US2020/029570
§ 371 (c)(1),
(2) Date: Oct. 25, 2021

(87) PCT Pub. No.: WO2020/219711
PCT Pub. Date: Oct. 29, 2020

(65) Prior Publication Data
US 2022/0198766 A1    Jun. 23, 2022

Related U.S. Application Data

(63) Continuation-in-part of application No. 16/551,572, filed on Aug. 26, 2019, now Pat. No. 10,636,116, and
(Continued)

(30) Foreign Application Priority Data

Apr. 23, 2019   (CA) ................................. CA 3040939
Oct. 21, 2019   (WO) .................. PCT/IB2019/058955

(51) Int. Cl.
*G06F 3/01* (2006.01)
*G02B 27/00* (2006.01)
(Continued)

(52) U.S. Cl.
CPC .............. *G06T 19/006* (2013.01); *G06T 3/20* (2013.01); *G06T 3/40* (2013.01); *G06T 5/73* (2024.01);
(Continued)

(58) Field of Classification Search
CPC ............................ G06F 3/013; G02B 27/0025
See application file for complete search history.

(56) References Cited

U.S. PATENT DOCUMENTS 4,562,374 A    12/1985   Sashida
5,032,754 A    7/1991    Iwao et al.
(Continued)

FOREIGN PATENT DOCUMENTS

AU    2015100739        7/2015
DE    9410161 U1        12/1994
(Continued)

OTHER PUBLICATIONS

U.S. Appl. No. 17/302,392 filed Apr. 30, 2021, Lussier.
(Continued)

*Primary Examiner* — Yi Yang
(74) *Attorney, Agent, or Firm* — Knobbe, Martens, Olson & Bear, LLP

(57) ABSTRACT

Described are various embodiments of a light field display and vibrating light field shaping layer therefor, adjusted pixel rendering method therefor, and vision testing and/or correction system and method using same.

13 Claims, 22 Drawing Sheets

Related U.S. Application Data a continuation-in-part of application No. 16/810,143, filed on Mar. 5, 2020, now Pat. No. 10,761,604.

(51) Int. Cl.
| | | |
|---|---|---|
| *G06T 3/20* | (2006.01) | |
| *G06T 3/40* | (2006.01) | |
| *G06T 5/73* | (2024.01) | |
| *G06T 7/70* | (2017.01) | |
| *G06T 19/00* | (2011.01) | |
| *G06V 40/19* | (2022.01) | |
| *G09G 3/00* | (2006.01) | |

(52) U.S. Cl.
CPC ............... *G06T 7/70* (2017.01); *G06V 40/19* (2022.01); *G09G 3/00* (2013.01); *G09G 3/03* (2020.08)

(56) References Cited

U.S. PATENT DOCUMENTS

| | | | |
|---|---|---|---|
| 5,959,664 | A | 9/1999 | Woodgate |
| 6,192,341 | B1 | 2/2001 | Becker et al. |
| 6,309,117 | B1 | 10/2001 | Bunce et al. |
| 6,386,707 | B1 | 5/2002 | Pellicano |
| 6,483,485 | B1 | 11/2002 | Huang et al. |
| 6,536,907 | B1 | 3/2003 | Towner et al. |
| 6,543,898 | B1 | 4/2003 | Griffin et al. |
| 6,784,905 | B2 | 8/2004 | Brown et al. |
| 6,809,704 | B2 | 10/2004 | Kulas |
| 6,820,979 | B1 | 11/2004 | Stark et al. |
| 6,876,758 | B1 | 4/2005 | Polat et al. |
| 6,953,249 | B1 | 10/2005 | Maguire, Jr. |
| 7,062,547 | B2 | 6/2006 | Brown et al. |
| 7,147,605 | B2 | 12/2006 | Ragauskas |
| 7,167,316 | B1* | 1/2007 | Gupta ............... G02B 13/22 |
| | | | 359/663 |
| 7,517,086 | B1 | 4/2009 | Kürkure |
| 7,567,307 | B2 | 7/2009 | Kim et al. |
| 7,760,430 | B2 | 7/2010 | Shestak et al. |
| 7,819,818 | B2 | 10/2010 | Ghajar |
| 7,866,817 | B2 | 1/2011 | Polat |
| 7,891,813 | B2 | 2/2011 | Ogilvie |
| 7,973,850 | B2 | 7/2011 | Ishiga |
| 8,089,512 | B2 | 1/2012 | Okabe et al. |
| 8,098,440 | B2 | 1/2012 | Jethmalani et al. |
| 8,164,598 | B2 | 4/2012 | Kimpe |
| 8,231,220 | B2 | 7/2012 | Baranton |
| 8,319,828 | B2 | 11/2012 | Kim et al. |
| 8,322,857 | B2 | 12/2012 | Barbur et al. |
| 8,373,684 | B2 | 2/2013 | Kim et al. |
| 8,540,375 | B2 | 9/2013 | Destain |
| 8,717,254 | B1 | 5/2014 | Nave et al. |
| 8,783,871 | B2 | 7/2014 | Pamplona et al. |
| 8,798,317 | B2 | 8/2014 | Wu |
| 8,823,742 | B2 | 9/2014 | Kweon |
| 8,857,984 | B2 | 10/2014 | Clarke et al. |
| 8,967,809 | B2 | 3/2015 | Kirschen et al. |
| 9,010,929 | B2 | 4/2015 | Lewis |
| 9,041,833 | B2 | 5/2015 | Hatakeyama |
| 9,052,502 | B2 | 6/2015 | Caldeira et al. |
| 9,066,683 | B2 | 6/2015 | Zhou |
| 9,104,233 | B2 | 8/2015 | Alberth |
| 9,159,299 | B2 | 10/2015 | Lee |
| 9,177,355 | B1 | 11/2015 | Buchheit |
| 9,183,806 | B2 | 11/2015 | Felt |
| 9,198,571 | B2 | 12/2015 | Kiderman et al. |
| 9,285,586 | B2 | 3/2016 | Hunt |
| 9,294,759 | B2 | 3/2016 | Hirai |
| 9,301,680 | B2 | 4/2016 | Fassi et al. |
| 9,307,940 | B2 | 4/2016 | MacLullich et al. |
| 9,492,074 | B1 | 11/2016 | Lee et al. |
| 9,625,398 | B1* | 4/2017 | Campbell ......... G01N 23/2252 |
| 9,642,522 | B2 | 5/2017 | Samadani et al. |
| 9,844,323 | B2 | 12/2017 | Pamplona et al. |
| 9,895,057 | B2 | 2/2018 | Tumlinson |
| 10,058,241 | B2 | 8/2018 | Patella et al. |
| 10,085,631 | B2 | 10/2018 | Shimizu et al. |
| 10,182,717 | B2 | 1/2019 | Lindig et al. |
| 10,206,566 | B2 | 2/2019 | Skolianos et al. |
| 10,247,941 | B2 | 4/2019 | Fürsich |
| 10,335,027 | B2 | 7/2019 | Pamplona et al. |
| 10,345,590 | B2 | 7/2019 | Samec et al. |
| 10,390,008 | B2 | 8/2019 | Smith et al. |
| 10,394,322 | B1 | 8/2019 | Gotsch |
| 10,420,467 | B2 | 9/2019 | Krall et al. |
| 10,548,473 | B2 | 2/2020 | Escalier et al. |
| 10,636,116 | B1 | 4/2020 | Gotsch |
| 10,761,604 | B2 | 9/2020 | Gotsch et al. |
| 2002/0024633 | A1 | 2/2002 | Kim et al. |
| 2002/0099305 | A1 | 7/2002 | Fukushima et al. |
| 2004/0057111 | A1 | 3/2004 | Motntes |
| 2005/0180648 | A1* | 8/2005 | Curry .................... H04N 1/642 |
| | | | 382/173 |
| 2006/0119705 | A1 | 6/2006 | Liao |
| 2008/0309764 | A1 | 12/2008 | Kubota et al. |
| 2009/0140950 | A1 | 6/2009 | Woo et al. |
| 2009/0290132 | A1 | 11/2009 | Shevlin |
| 2010/0149073 | A1* | 6/2010 | Chaum ............... G02B 27/017 |
| | | | 345/8 |
| 2010/0156214 | A1 | 6/2010 | Yang |
| 2010/0277693 | A1 | 11/2010 | Martinez-Conde et al. |
| 2010/0298735 | A1 | 11/2010 | Suffin |
| 2011/0019056 | A1 | 1/2011 | Hirsch et al. |
| 2011/0122144 | A1 | 5/2011 | Gabay |
| 2011/0157180 | A1 | 6/2011 | Burger et al. |
| 2011/0248837 | A1* | 10/2011 | Israr .................... G06F 3/016 |
| | | | 340/407.1 |
| 2011/0268868 | A1 | 11/2011 | Dowski, Jr. et al. |
| 2012/0010474 | A1 | 1/2012 | Olsen et al. |
| 2012/0113389 | A1 | 5/2012 | Mukai et al. |
| 2012/0206445 | A1 | 8/2012 | Chiba |
| 2012/0249951 | A1 | 10/2012 | Hirayama |
| 2012/0254779 | A1 | 10/2012 | Ollivierre et al. |
| 2012/0262477 | A1 | 10/2012 | Buchheit |
| 2013/0027384 | A1 | 1/2013 | Ferris |
| 2013/0027668 | A1 | 1/2013 | Pamplona et al. |
| 2013/0096820 | A1 | 4/2013 | Agnew |
| 2013/0120390 | A1 | 5/2013 | Marchand et al. |
| 2013/0222652 | A1 | 8/2013 | Akeley et al. |
| 2013/0303981 | A1* | 11/2013 | Kizhakkedathu ..... A61L 29/085 |
| | | | 428/95 |
| 2014/0028662 | A1 | 1/2014 | Liao et al. |
| 2014/0055692 | A1 | 2/2014 | Kroll et al. |
| 2014/0063332 | A1 | 3/2014 | Miyawaki |
| 2014/0118354 | A1 | 5/2014 | Pais et al. |
| 2014/0137054 | A1 | 5/2014 | Gandhi et al. |
| 2014/0200079 | A1 | 7/2014 | Bathiche et al. |
| 2014/0253876 | A1 | 9/2014 | Klin et al. |
| 2014/0267284 | A1 | 9/2014 | Blanche et al. |
| 2014/0268060 | A1 | 9/2014 | Lee et al. |
| 2014/0282285 | A1 | 9/2014 | Sadhvani et al. |
| 2014/0327750 | A1 | 11/2014 | Malachowsky et al. |
| 2014/0327771 | A1 | 11/2014 | Malachowsky et al. |
| 2014/0340390 | A1 | 11/2014 | Lanman et al. |
| 2015/0049390 | A1 | 2/2015 | Lanman et al. |
| 2015/0177514 | A1 | 6/2015 | Maimone et al. |
| 2015/0185501 | A1 | 7/2015 | Bakaraju et al. |
| 2015/0234187 | A1 | 8/2015 | Lee |
| 2015/0234188 | A1 | 8/2015 | Lee |
| 2015/0262424 | A1 | 9/2015 | Tabaka et al. |
| 2015/0286064 | A1* | 10/2015 | Liu ..................... G03B 21/208 |
| | | | 353/38 |
| 2015/0336511 | A1 | 11/2015 | Ukeda |
| 2016/0042501 | A1 | 2/2016 | Huang et al. |
| 2016/0103419 | A1 | 4/2016 | Callagy et al. |
| 2016/0134815 | A1 | 5/2016 | Ishiguro et al. |
| 2016/0260258 | A1* | 9/2016 | Lo ..................... G02B 27/0172 |
| 2016/0306390 | A1 | 10/2016 | Vertegaal et al. |
| 2016/0335749 | A1 | 11/2016 | Kano |
| 2017/0027435 | A1 | 2/2017 | Boutinon et al. |
| 2017/0045738 | A1* | 2/2017 | Kim ..................... G02B 5/30 |
| 2017/0060399 | A1 | 3/2017 | Hough et al. |
| 2017/0212352 | A1 | 7/2017 | Cobb et al. |

(56) References Cited

U.S. PATENT DOCUMENTS

| | | |
|---|---|---|
| 2017/0227781 A1 | 8/2017 | Banerjee et al. |
| 2017/0302913 A1 | 10/2017 | Tonar et al. |
| 2017/0307898 A1 | 10/2017 | Vdovin et al. |
| 2017/0315371 A1 | 11/2017 | Johnson et al. |
| 2017/0353717 A1 | 12/2017 | Zhou et al. |
| 2017/0365101 A1 | 12/2017 | Samec et al. |
| 2017/0365189 A1 | 12/2017 | Halpin et al. |
| 2018/0070820 A1 | 3/2018 | Fried et al. |
| 2018/0084245 A1 | 3/2018 | Lapstun |
| 2018/0136486 A1* | 5/2018 | Macnamara ............ G16H 50/20 |
| 2018/0203232 A1 | 7/2018 | Bouchier et al. |
| 2018/0252935 A1 | 9/2018 | Vertegaal et al. |
| 2018/0290593 A1 | 10/2018 | Cho |
| 2018/0330652 A1 | 11/2018 | Perreault et al. |
| 2019/0064536 A1 | 2/2019 | Dow et al. |
| 2019/0125179 A1 | 5/2019 | Xu et al. |
| 2019/0150729 A1 | 5/2019 | Huang et al. |
| 2019/0175011 A1 | 6/2019 | Jensen et al. |
| 2019/0228586 A1 | 7/2019 | Bar-Zeev et al. |
| 2019/0246095 A1 | 8/2019 | Kishimoto |
| 2019/0246889 A1 | 8/2019 | Marin et al. |
| 2019/0310478 A1 | 10/2019 | Marin et al. |
| 2020/0012090 A1 | 1/2020 | Lapstun |
| 2020/0069174 A1 | 3/2020 | Marin et al. |
| 2020/0211507 A1 | 7/2020 | Clarke et al. |
| 2020/0233492 A1 | 7/2020 | Gotsch et al. |

FOREIGN PATENT DOCUMENTS

| | | |
|---|---|---|
| DE | 102004038822 A1 | 3/2006 |
| DE | 102016212761 | 5/2018 |
| DE | 102018121742 A1 | 3/2020 |
| DE | 102018129600 A1 | 5/2020 |
| DE | 102019102373 A1 | 7/2020 |
| EP | 2127949 A1 | 12/2009 |
| EP | 1509121 B1 | 9/2012 |
| EP | 2589020 A2 | 5/2013 |
| EP | 2678804 A1 | 1/2014 |
| EP | 2760329 A1 | 8/2014 |
| EP | 2999393 A1 | 3/2016 |
| EP | 2547248 B1 | 5/2017 |
| EP | 3262617 A1 | 1/2018 |
| EP | 3339943 A1 | 6/2018 |
| EP | 3367307 A3 | 12/2018 |
| EP | 2828834 B1 | 11/2019 |
| EP | 3620846 A1 | 3/2020 |
| EP | 3631770 A1 | 4/2020 |
| EP | 3657440 A1 | 5/2020 |
| EP | 3659109 A1 | 6/2020 |
| EP | 3689225 A1 | 8/2020 |
| EP | 3479344 B1 | 12/2020 |
| FR | 3059537 B1 | 5/2019 |
| JP | 2003038443 A | 2/2003 |
| WO | 2007031931 A2 | 3/2007 |
| WO | 2011156721 A1 | 12/2011 |
| WO | 2013166570 A1 | 11/2013 |
| WO | 2014014603 A2 | 1/2014 |
| WO | 2014174168 A1 | 10/2014 |
| WO | 2014197338 A2 | 12/2014 |
| WO | 2015162098 A1 | 10/2015 |
| WO | 2017146314 A1 | 8/2017 |
| WO | 2017192887 A2 | 11/2017 |
| WO | 2017218539 A1 | 12/2017 |
| WO | 2018022521 A1 | 2/2018 |
| WO | 2018092989 A1 | 5/2018 |
| WO | 2018129310 A1 | 7/2018 |
| WO | WO2021038421 A1 | 8/2020 |
| WO | WO2021087384 | 10/2020 |
| WO | 2021122640 A1 | 6/2021 |

OTHER PUBLICATIONS

U.S. Appl. No. 17/309,133 filed Apr. 29, 2021, Gotsch.

"A Computational Light Field Display for Correcting Visual Aberrations," Huang, F.C., Technical Report No. UCB/EECS-2013-206, Electrical Engineering and Computer Sciences University of California at Berkeley, http://www.eecs.berkeley.edu/Pubs/TechRpts/2013/EECS-2013-206.html, Dec. 15, 2013.

"Eyeglasses-free Display: Towards Correcting Visual Aberrations with Computational Light Field Displays", by Huang et al., taken from http://web.media.mit.edu/~gordonw/VisionCorrectingDisplay/, published Aug. 2, 2014, pp. 1-15.

Agus M. et al., "GPU Accelerated Direct Volume Rendering on an Interactive Light Field Display", Eurographics 2008, vol. 27, No. 2, 2008.

Burnett T., "FoVI3D Extreme Multi-view Rendering for Light-field Displays", GTC 2018 (GPU Technology Conference), Silicon Valley, 2018.

Ciuffreda, Kenneth J., et al., Understanding the effects of mild traumatic brain injury on the pupillary light reflex, Concussion (2017) 2(3), CNC36.

Fattal, D. et al., A Multi-Directional Backlight for a Wide-Angle, Glasses-Free Three-Dimensional Display, Nature, Mar. 21, 2013, pp. 348-351, vol. 495.

Fielmann Annual Report 2019 (https://www.fielmann.eu/downloads/fielmann_annual_report_2019.pdf).

Gray, Margot, et al., Female adolescents demonstrate greater oculomotor and vestibular dysfunction than male adolescents following concussion, Physical Therapy in Sport 43 (2020) 68-74.

Halle M., "Autostereoscopic displays and computer graphics", Computer Graphics, ACM SIGGRAPH, 31(2), May 1997, pp. 58-62.

Howell, David R., et al., Near Point of Convergence and Gait Deficits in Adolescents After Sport-Related Concussion, Clin J Sport Med, 2017.

Howell, David R., et al., Receded Near Point of Convergence and Gait Are Associated After Concussion, Br J Sports Med, Jun. 2017; 51:e1, p. 9 (Abstract).

Huang, F.C et al., "Eyeglasses-Free Display: Towards Correcting Visual Aberrations With Computational Light Field Displays,", ACM Transactions on Graphics (TOG)—Proceedings of ACM SIGGRAPH 2014, vol. 33, Issue 4, Article No. 59 , Jul. 2014.

Kawata, K., et al., Effect of Repetitive Sub-concussive Head Impacts on Ocular Near Point of Convergence, In t. J Sports Med 2016; 37; 405-410.

Lewin, Sarah "No Need for Reading Glasses With Vision-Correcting Display", published 2014.

Mainone, Andrew, et al. "Focus 3D: Compressive accommodation display." ACM Trans. Graph. 32.5 (2013): 153-1.

Masia B. et al., "A survey on computational displays: Pushing the boundaries of optics, computation, and perception", Computer & Graphics, vol. 37, 2013, pp. 1012-1038.

Murray, Nicholas G., et al., Smooth Pursuit and Saccades after Sport-Related Concussion, Journal of Neurotrauma 36: 1-7 (2019).

Pamplona V. F. et al., "Tailored Displays to Compensate for Visual Aberrations," ACM Transactions on Graphics (TOG), Jul. 2012 Article No. 81, https://doi.org/10.1145/2185520.2185577.

Pamplona V. F., Thesis (Ph.D.)—Universidade Federal do Rio Grande do Sul. Programa de Pós-Graduação em Computação, Porto Alegre, BR-RS, 2012. Advisor: Manuel Menezes de Oliveira Neto.

Ventura, Rachel E., et al., Diagnostic Tests for Concussion: Is Vision Part of the Puzzle?, Journal of Neuro-Ophthalmology 2015; 35; 73-81.

Wetzstein, G. et al., "Tensor Displays: Compressive Light Field Synthesis using Multilayer Displays with Directional Backlighting", https://web.media.mit.edu/~gordonw/TensorDisplays/TensorDisplays.pdf.

Zahid, Abdullah Bin, et al., Eye Tracking as a Biomarker for Concussion in Children, Clin J Sport Med 2018.

A. Jacobs et al., 2D/3D Switchable Displays, online (https://global.sharp/corporate/info/rd/tj4/pdf/4.pdf), Jan. 14, 2003.

A. Nakai, K. Matsumoto and I. Shimoyama, "A stereoscopic display with a vibrating microlens array," Technical Digest. MEMS 2002 IEEE International Conference. Fifteenth IEEE International Conference on Micro Electro Mechanical Systems (Cat. No. 02CH37266), Las Vegas, NV, USA, 2002, pp. 524-527.

(56) References Cited

OTHER PUBLICATIONS

A.J. Woods, "How are Crosstalk and Ghosting defined in the Stereo-scopic Literature?," in Proc. SPIE Stereoscopic Displays and Applica-tions XXII, vol. 7863, 78630Z (2011).
Alioscopy Inc., "Alioscopy Glasses-Free 3D Displays" [Online] Available: http://www.alioscopy.com/en/3Ddisplays.php, Accessed Oct. 28, 2019.
C. Kim, et. al., "Electrowetting Lenticular Lens for a Multi-View Autostereoscopic 3D Display," IEEE Photonics Technology Letters, vol. 28, No. 22, pp. 2479-2482, 2016.
C.V. Berkel, "Image Preparation for 3D-LCD," Philips Research Labo-ratories, Redhill, UK, [Online] Available: http://www.loreti.it/Download/PDF/LCD/spie99-1460.pdf.
D. Lanman, et al., Content-adaptive parallax barriers: optimizing dual-layer 3D displays using low-rank light field factorization. In ACM SIGGRAPH Asia 2010 papers (SIGGRAPH Asia '10). ACM, New York, NY, USA, Article 163, 10 pages.
David E. Roberts, "History of Lenticular and Related Autostereoscopic Methods," [Online] Available: http://www.microlens.com/pdfs/history_of_lenticular.pdf, Accessed Oct. 23, 2019.
G. Wetzstein, et al., Tensor displays: compressive light field synthesis using multilayer displays with directional backlighting. ACM Transactions on Graphics. 31. 1-11. 2012.
G.J. Lv, et. al., "3D display based on parallax barrier with multiview zones, OSA Publishing," vol. 53, Issue 7, 2014.
J.Y. Hong, et. al., "See-through multi-view 3D display with parallax barrier," Advances in Display Technologies VI. vol. 9770. International Society for Optics and Photonics, 2016.
L. Lipton, "Factors affecting "ghosting" in time-multiplexed piano-stereoscopic CRT display systems," in Proc. SPIE True Three-Dimensional Imaging Techniques and Display Technologies, pp. 75-78, 1987.
L. Lipton, "Glossary in Lenny Lipton's Blog," [Online], Available: http://lennylipton.wordpress.com/2009/03/16/glossary/, Accessed: Oct. 30, 2019.
Lee, B., Park, S.-gi, Hong, K., & Hong, J. (2016). Chapter 3. In Design and implementation of autostereoscopic displays. essay, SPIE Press.
P. Lincoln, et al., Multi-view lenticular display for group teleconferencing. 22.10.4108/immerscom.2009.23. (https://www.researchgate.net/publication/234797834_Multi-view_lenticular_display_for_group_teleconferencing) (2009).
Philips Inc., "High-performance multiview monitors," [Online] Avail-able: https://www.philips.co.uk/c-m-so/monitors/features/multiview.
R. Barry Johnson, and G. Jacobsen, "Advances in lenticular lens arrays for visual display," (Invited Paper), DOI: 10.1117/12.618082, 2005.
S. Lee, et. al., "Autostereoscopic 3D display using directional subpixel rendering," Optics Express, vol. 26, No. 16, 2018.
S.K. Kim, et. al., "Parallax barrier engineering for image quality im-provement in an autostereoscopic 3D display," Optics Express, vol. 23, Issue 10, 2015.
T. Peterka, "Dynallax: Dynamic Parallax Barrier Autostereoscopic Dis-play," Ph.D. Dissertation, University of Illinois at Chicago, 2007.
T. Peterka, et al., Advances in the Dynallax Solid-State Dynamic Parallax Barrier Autostereoscopic Visualization Display System, IEEE Transactions on Visualization and Computer Graphics, vol. 14, No. 3, May/Jun. 2008.
V.A. Ezhov, "Autostereoscopic Multiview Full-Resolution Imaging Based on Amplitude-Polarization Imager with Passive-Polarization and Active-Amplitude Parallax Barriers," Physics of Wave Phenomena, Springer, vol. 26, Issue 2, pp. 124-138, 2018.
X. Zhang, et. al., "A spatio-temporal multiplexing multi-view display using a lenticular lens and a beam steering screen," Optics Communi-cations, Elsevier, vol. 420, pp. 168-173, 2018.

\* cited by examiner

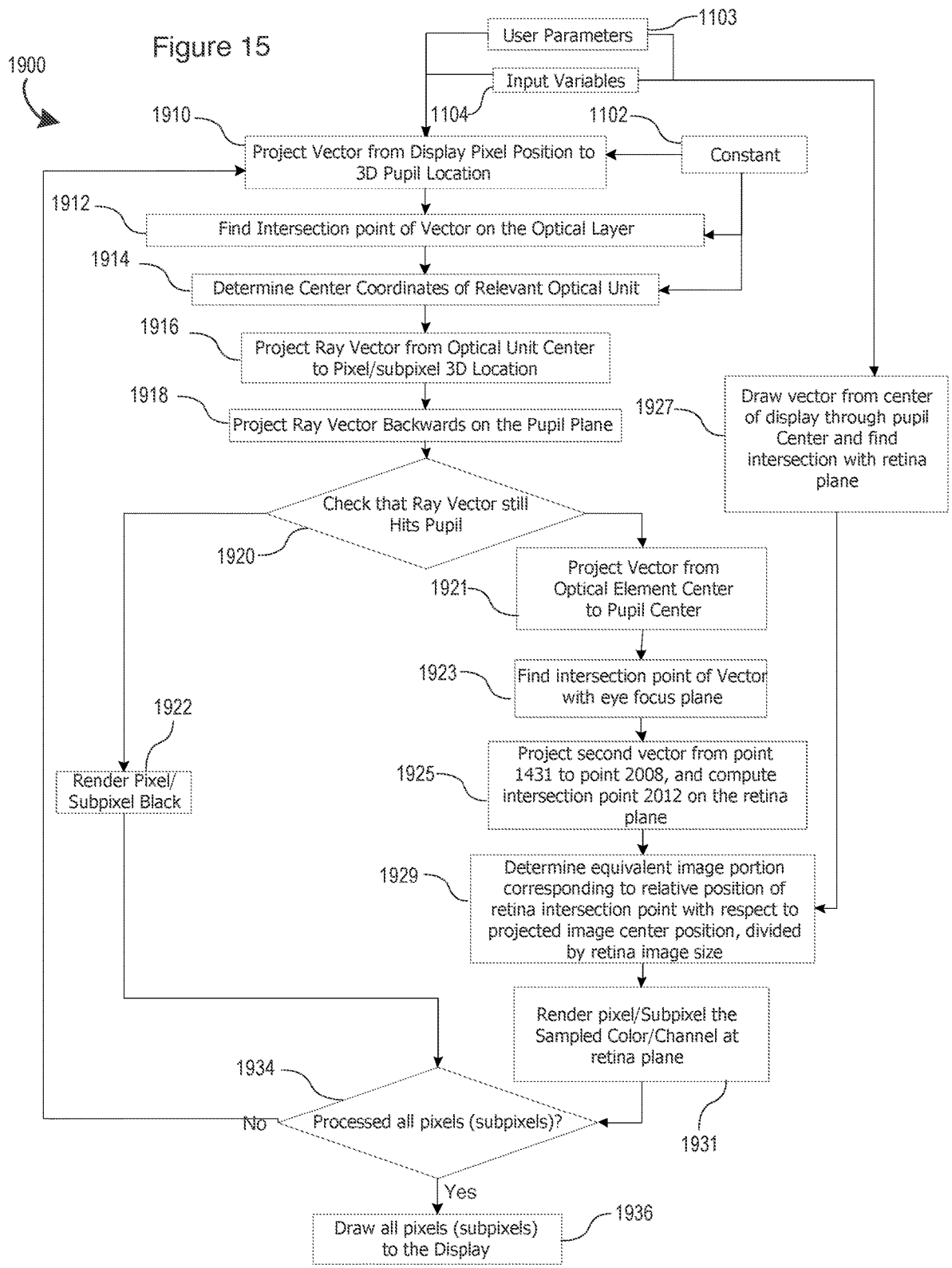

LIGHT FIELD DISPLAY AND VIBRATING LIGHT FIELD SHAPING LAYER AND VISION TESTING AND/OR CORRECTION DEVICE

CROSS REFERENCE TO RELATED APPLICATIONS

This application the U.S. National Phase Application under 35 U.S.C. § 371 of International Application No. PCT/US2020/029570, filed Apr. 23, 2020, which is a continuation-in-part of U.S. patent application Ser. No. 16/810,143 filed Mar. 5, 2020 and U.S. patent application Ser. No. 16/551,572 filed Aug. 26, 2019, and which claims priority to International Application No. PCT/IB2019/058955 filed Oct. 21, 2019 and Canadian Patent Application No. 3,040,939 filed Apr. 23, 2019, the entire disclosure of each of which is hereby incorporated herein by reference.

FIELD OF THE DISCLOSURE

The present disclosure relates to digital displays, and in particular, to a light field display, adjusted pixel rendering method therefor, and vision correction system and method using same.

BACKGROUND

Individuals routinely wear corrective lenses to accommodate for reduced vision acuity in consuming images and/or information rendered, for example, on digital displays provided, for example, in day-to-day electronic devices such as smartphones, smart watches, electronic readers, tablets, laptop computers and the like, but also provided as part of vehicular dashboard displays and entertainment systems, to name a few examples. The use of bifocals or progressive corrective lenses is also commonplace for individuals suffering from near and far sightedness.

The operating systems of current electronic devices having graphical displays offer certain "Accessibility" features built into the software of the device to attempt to provide users with reduced vision the ability to read and view content on the electronic device. Specifically, current accessibility options include the ability to invert images, increase the image size, adjust brightness and contrast settings, bold text, view the device display only in grey, and for those with legal blindness, the use of speech technology. These techniques focus on the limited ability of software to manipulate display images through conventional image manipulation, with limited success.

Light field displays using lenslet arrays or parallax barriers have been proposed for correcting such visual aberrations. For a thorough review of Autostereoscopic or light field displays, Halle M. (Halle, M., "Autostereoscopic displays and computer graphics" ACM SIGGRAPH, 31(2), pp. 58-62, 1997) gives an overview of the various ways to build a glasses-free 3D display, including but not limited to parallax barriers, lenticular sheets, microlens arrays, holograms, and volumetric displays for example. Moreover, the reader is also directed to another article by Masia et al. (Masia B., Wetzstein G., Didyk P. and Gutierrez, "A survey on computational displays: Pushing the boundaries of optics, computation and perception", Computer & Graphics 37 (2013), 1012-1038) which also provides a good review of computational displays, notably light field displays at section 7.2 and vision correcting light field displays at section 7.4.

An example of using light field displays to correct visual aberrations has been proposed by Pamplona et al. (PAMPLONA, V., OLIVEIRA, M., ALIAGA, D., AND RASKAR, R. 2012. "Tailored displays to compensate for visual aberrations." ACM Trans. Graph. (SIGGRAPH) 31). Unfortunately, conventional light field displays as used by Pamplona et al. are subject to a spatio-angular resolution trade-off; that is, an increased angular resolution decreases the spatial resolution. Hence, the viewer sees a sharp image but at the expense of a significantly lower resolution than that of the screen. To mitigate this effect, Huang et al. (see, HUANG, F.-C., AND BARSKY, B. 2011. A framework for aberration compensated displays. Tech. Rep. UCB/EECS-2011-162, University of California, Berkeley, December; and HUANG, F.-C., LANMAN, D., BARSKY, B. A., AND RASKAR, R. 2012. Correcting for optical aberrations using multi layer displays. ACM Trans. Graph. (SiGGRAPH Asia) 31, 6, 185:1-185:12. proposed the use of multilayer display designs together with prefiltering. The combination of pre-filtering and these particular optical setups, however, significantly reduces the contrast of the resulting image.

Moreover, in U.S. Patent Application Publication No. 2016/0042501 and Fu-Chung Huang, Gordon Wetzstein, Brian A. Barsky, and Ramesh Raskar. "Eyeglasses-free Display: Towards Correcting Visual Aberrations with Computational Light Field Displays". ACM Transaction on Graphics, xx:0, August 2014, the entire contents of each of which are hereby incorporated herein by reference, the combination of viewer-adaptive pre-filtering with off-the-shelf parallax barriers has been proposed to increase contrast and resolution, at the expense however, of computation time and power.

Another example includes the display of Wetzstein et al. (Wetzstein, G. et al., "Tensor Displays: Compressive Light Field Synthesis using Multilayer Displays with Directional Backlighting", https://web.media.mit.edu/-gordonw/Tensor-Displays/TensorDisplays.pdf) which disclose a glass-free 3D display comprising a stack of time-multiplexed, light-attenuating layers illuminated by uniform or directional backlighting. However, the layered architecture may cause a range of artefacts including Moiré effects, color-channel crosstalk, interreflections, and dimming due to the layered color filter array. Similarly, Agus et al. (AGUS M. et al., "GPU Accelerated Direct Volume Rendering on an Interactive Light Field Display", EUROGRAPHICS 2008, Volume 27, Number 2, 2008) disclose a GPU accelerated volume ray casting system interactively driving a multi-user light field display. The display, produced by the Holographika company, uses an array of specially arranged array of projectors and a holographic screen to provide glass-free 3D images. However, the display only provides a parallax effect in the horizontal orientation as having parallax in both vertical and horizontal orientations would be too computationally intensive. Finally, the FOVI3D company (http://on-demand.g-putechconf.com/gtc/2018/presentation/s8461-extreme-multi-view-rendering-for-light-field-displays.pdf) provides light field displays wherein the rendering pipeline is a replacement for OpenGL which transports a section of the 3D geometry for further processing within the display itself. This extra processing is possible because the display is integrated into a bulky table-like device.

While the above-noted references propose some light field display solutions, most suffer from one or more drawbacks which limits their commercial viability, particularly in seeking to provide vision correction solutions, but also in providing other image perception adjustments and experiences. One such drawback relates to resolution tradeoffs resulting from the implementation of light field displays and related image adjustments associated therewith in producing intended visual adjustments and/or experiences.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a light field display, and light field shaping layer therefor, that overcome some of the drawbacks of known techniques, or at least, provide a useful alternative thereto. Some aspects of the disclosure provide embodiments of such systems, methods and displays. For example, some aspects provide for a light field display and vibrating light field shaping layer therefor. In some such aspects, a vision testing and/or correction device incorporates such a light field display and vibrating light field shaping layer.

A need also exists for a light field vision testing and/or correction device, adjusted pixel rendering method therefor, and vision correction and/or testing system and method using same, that overcome some of the drawbacks of known techniques, or at least, provide a useful alternative thereto. Some aspects of disclosure provide embodiments of such systems, methods, and devices.

In accordance with one aspect, there is provided a light field display having a vibrating light field shaping layer disposed thereon.

In accordance with one such aspect, there is provided a light field display comprising a digital display and a vibrating light field shaping layer (LFSL) operatively disposed to vibrate relative thereto.

In one embodiment, the vibrating LFSL comprises a microlens array.

In one embodiment, the vibrating LFSL comprises one of a linearly vibrating LFSL, circularly vibrating LFSL or an elliptically vibrating LFSL.

In accordance with another aspect, there is provided a light field display comprising: a digital display; a light field shaping layer (LFSL) disposed thereon; and an actuator operable to vibrate said LFSL relative to said digital display.

In one embodiment, the actuator comprises a piezoelectric transducer.

In one embodiment, the actuator comprises an ultrasonic motor.

In one embodiment, the actuator comprises at least one of a linear actuator, a circular actuator or an elliptical actuator.

In one embodiment, the actuator is operable to vibrate said LFSL according to a predictable oscillatory motion relative to said digital display.

In one embodiment, the digital display comprises an array of digital pixels, and wherein the light field display further comprises a digital data processor operable to control an optical output by each of said digital pixels to predictably interface with said LFSL, wherein said optical output is controllably synchronized with said predictable oscillatory motion.

In one embodiment, the LFSL comprises a microlens array.

In accordance with another aspect, there is provided a digital display device operable to automatically adjust user perception of an input image to be rendered thereon, the device comprising: a digital display medium comprising an array of pixels and operable to render a pixelated image accordingly; a light field shaping layer (LFSL) defined by an array of LFSL elements and disposed relative to said digital display medium to shape a light field emanating therefrom and thereby at least partially govern a projection thereof from said display medium toward the viewer; an actuator operatively coupled to said LFSL and operable to oscillate the LSFL relative to said digital display medium so as to cyclically displace a position of said LFSL elements relative to said array of pixels over time during use; and a hardware processor operable on pixel data for the input image to output adjusted image pixel data to be rendered via said digital display medium and projected through said LFSL, thereby rendering a perceptively adjusted version of the input image.

In one embodiment, the hardware processor is further operable to synchronize said output adjusted image pixel data with said position.

In one embodiment, the device further comprises a sensor operatively coupled to said hardware processor and operable to sense said position over time.

In one embodiment, the actuator comprises a linear actuator.

In one embodiment, the actuator comprises a circular or elliptical actuator.

In one embodiment, the actuator comprises a bidirectional actuator.

In one embodiment, the actuator is a continuous motion actuator.

In one embodiment, the actuator comprises a step-wise or discrete motion actuator, wherein said position is sequenced through a designated set of discrete intermediary positions.

In accordance with another aspect, there is provided a device operable to dynamically adjust user perception of an input image, the device comprising: an array of digital display pixels; a corresponding array of light field shaping elements (LFSEs) shaping a light field emanating from said pixels; and a hardware processor operable on pixel data for the input image to output adjusted image pixel data to be rendered via said LFSEs to dynamically adjust user perception of the input image as rendered therethrough by: digitally mapping the input image on an adjusted image plane corresponding to a designated vision correction parameter associated with a given visual acuity level; for each given pixel, digitally: projecting an adjusted image ray trace between said given pixel and a user pupil location to intersect said adjusted image plane at a given adjusted image location given a direction of a light field emanated by said given pixel based on a given LFESE intersected thereby; and associating an adjusted image pixel value designated for said given adjusted image location with said given pixel based on said mapping; rendering each said given pixel according to said adjusted pixel value, thereby rendering a perceptively adjusted version of the input image that at least partially accommodates said given visual acuity level; and adjusting said designated vision correction parameter to accommodate for a distinct visual acuity level until an optimal visual acuity level is identified.

In accordance with another aspect, there is provided a subjective eye test device comprising: an array of digital display pixels; a corresponding array of light field shaping elements (LFSEs) shaping a light field emanating from said pixels; and a hardware processor operable on pixel data for a defined optotype to output adjusted image pixel data to be rendered via said LFSEs to dynamically adjust user perception of said defined optotype as rendered therethrough by: digitally mapping said defined optotype on an adjusted image plane corresponding to a designated vision correction parameter associated with a given visual acuity level; for each given pixel, digitally: projecting an adjusted image ray trace between said given pixel and a user pupil location to intersect said adjusted image plane at a given adjusted image location given a direction of a light field emanated by said given pixel based on a given LFESE intersected thereby; and associating an adjusted image pixel value designated for said given adjusted image location with said given pixel based on said mapping; and rendering each said given pixel according to said adjusted pixel value, thereby rendering a perceptively adjusted version of said defined optotype that at least partially accommodates said given visual acuity level; and adjusting said designated vision correction parameter to accommodate for a distinct visual acuity level until an optimal visual acuity level is identified.

In accordance with another aspect, there is provided a computer-implemented method, automatically implemented by one or more digital processors, to dynamically adjust user perception of an input image to be rendered by an array of digital display pixels via a corresponding array of light field shaping elements (LFSE), the method comprising: digitally mapping the input image on an adjusted image plane corresponding to a designated vision correction parameter associated with a given visual acuity level; for each given pixel, digitally: projecting an adjusted image ray trace between said given pixel and a user pupil location to intersect said adjusted image plane at a given adjusted image location given a direction of a light field emanated by said given pixel based on a given LFESE intersected thereby; and associating an adjusted image pixel value designated for said given adjusted image location with said given pixel based on said mapping; rendering each said given pixel according to said adjusted pixel value, thereby rendering a perceptively adjusted version of the input image that at least partially accommodates said given visual acuity level; and adjusting said designated vision correction parameter to accommodate for a distinct visual acuity level until an optimal visual acuity level is identified.

In accordance with another aspect, there is provided a non-transitory computer-readable medium comprising digital instructions to be implemented by one or more digital processors to dynamically adjust user perception of an input image to be rendered by an array of digital display pixels via a corresponding array of light field shaping elements (LFSE), by: digitally mapping the input image on an adjusted image plane corresponding to a designated vision correction parameter associated with a given visual acuity level; for each given pixel, digitally: projecting an adjusted image ray trace between said given pixel and a user pupil location to intersect said adjusted image plane at a given adjusted image location given a direction of a light field emanated by said given pixel based on a given LFESE intersected thereby; and associating an adjusted image pixel value designated for said given adjusted image location with said given pixel based on said mapping; rendering each said given pixel according to said adjusted pixel value, thereby rendering a perceptively adjusted version of the input image that at least partially accommodates said given visual acuity level; and adjusting said designated vision correction parameter to accommodate for a distinct visual acuity level until an optimal visual acuity level is identified.

In accordance with another aspect, there is provided a device operable to dynamically adjust user perception of an input image, the device comprising: an array of digital display pixels; a corresponding array of light field shaping elements (LFSEs) shaping a light field emanating from said pixels and operatively disposed to vibrate relative thereto; and a digital processor operable on pixel data for the input image to output adjusted image pixel data to be rendered via said LFSEs to adjust user perception of the input image as rendered therethrough by: for at least some of said pixels, digitally: projecting an adjusted ray trace linking a given pixel and a pupil location given a corresponding LFSE, to intersect an adjusted image plane at a given adjusted image plane location, wherein said adjusted image plane is designated to provide a designated image perception adjustment; and associating an adjusted pixel value designated for said given adjusted plane location with said given pixel; and rendering each said given pixel according to said adjusted pixel value, thereby rendering a perceptively adjusted version of the input.

In one embodiment, the adjusted image plane corresponds to a designated vision correction parameter associated with a given visual acuity level such that said perceptively adjusted version of the input accommodates for said given visual acuity level; and wherein said digital processor is further operable to adjust said designated vision correction parameter to accommodate for a distinct visual acuity level until an optimal visual acuity level is identified.

In one embodiment, the device is a subjective eye testing device.

In one embodiment, the adjusted image plane corresponds to a designated vision correction parameter associated with a given visual acuity level such that said perceptively adjusted version of the input at least partially accommodates for said given visual acuity level.

In one embodiment, the device comprises a vibrating light field shaping layer comprising said array of LFSEs and disposed to vibrate in a plane thereof relative to said array of digital display pixels.

In one embodiment, the vibrating LFSL comprises at least one of a microlens array or a parallax barrier.

In one embodiment, the vibrating LFSL comprises one of a linearly vibrating LFSL, a circularly vibrating LFSL or an elliptically vibrating LFSL.

In one embodiment, the device further comprises an actuator operable to vibrate said LFSL relative to said digital display pixels.

In one embodiment, the actuator comprises a piezoelectric transducer.

In one embodiment, the actuator comprises an ultrasonic motor.

In one embodiment, the actuator comprises at least one of a linear actuator, a circular actuator or an elliptical actuator.

In one embodiment, the actuator is operable to vibrate said LFSL according to a predictable oscillatory motion relative to said digital display pixels.

In one embodiment, the digital processor is operable to synchronize said associating of said adjusted pixel value with each said given pixel with said predictable oscillatory motion to control an optical output by each said given pixel to predictably interface with said corresponding LFSE as said LFSL vibrates.

In one embodiment, the digital processor is operable to executed said projecting as a function of a known position of said corresponding LFSE given said predictable oscillatory motion.

In one embodiment, the known position is an average or central position given said predictable oscillatory motion.

In one embodiment, the known position is an actual position at a given time based on said predictable oscillatory motion.

In one embodiment, a total number of given pixels interfacing with any said corresponding LFSE to ultimately intersect said pupil location is increased due to said vibrating array of LFSEs.

In one embodiment, the increased number results in an increased brightness.

In one embodiment, the increased number results in an increased resolution.

In one embodiment, a total number of given pixels interfacing with any said corresponding LFSE to ultimately intersect said pupil location is increased during any given vibration cycle is defined at least in part by an optical LFSE parameter and a vibration amplitude of said array of LFSEs.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 15 is a process flow diagram of an illustrative ray-tracing rendering process, in accordance with another embodiment;

Figure 1:
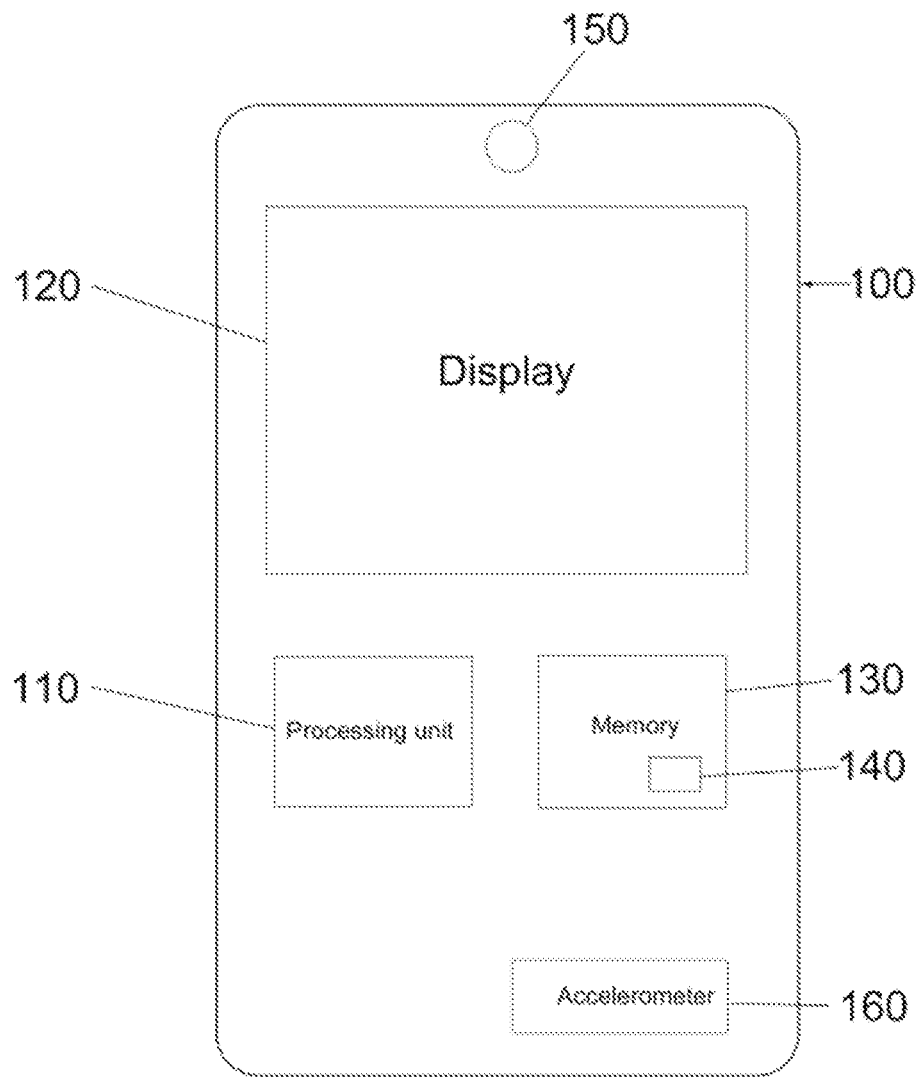
FIG. 1 is a diagrammatical view of an electronic device having a digital display, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples of a light field system and method in which a light field shaping layer (LFSL) disposed upon a digital pixel display is operable to vibrate, e.g. move or oscillate to and fro relative thereto so to reduce perceived optical artifacts, provide an increased perceived resolution, or like benefits, thus improving a user experience.

For example, light field displays typically have a reduced perceived resolution compared to the original resolution of the underlying pixel array. This is because light emitted from a subset of pixels of the digital display may be, at least partially, blocked or attenuated by a given placement of different optical elements of the light field shaping layer. Accordingly, at least some of the underlying digital display pixels become unavailable or ineffective in rendering the intended image. Furthermore, while digital display pixels typically emit an isotropically distributed light field such that light emitted by each pixel can typically reach the viewers pupils, light field rendering solutions will invariably produce more directional light fields that, in some circumstance, may not intersect with a user's pupil location(s). Accordingly, visual artefacts and/or a reduced perceived resolution may ensue.

In accordance with some of the herein-described embodiments, means are provided to vibrate the LFSL relative to the digital display at a rate generally too fast to be perceived by a user viewing the display but with the added effect that each optical element of the LFSL may, over any given cycle, allow light emitted from a larger number of pixels to positively intersect with the viewer's pupils than would otherwise be possible with a static LFSL configuration.

In some embodiments, the implementation of a vibrating light field shaping layer can result in an improved perceived resolution of the adjusted image, thereby improving performance of the adjusted image perception solution being executed, which may include, but is not limited to, solutions for accommodating and/or testing a viewer's reduced visual acuity. For example, some of the embodiments described herein provide for digital display devices, or devices encompassing such displays, for use by users having reduced visual acuity, whereby images ultimately rendered by such devices can be dynamically processed to accommodate the user's reduced visual acuity so that they may consume rendered images without the use of corrective eyewear, as would otherwise be required. For instance, in some examples, users who would otherwise require corrective eyewear such as glasses or contact lenses, or again bifocals, may consume images produced by such devices, displays and methods in clear or improved focus without the use of such eyewear. Similarly, examples of a light field vision testing device, such as a light field refractor and/or refractor, adjusted pixel rendering method therefor, and vision testing system and method using same, are also described herein. For example, a subjective vision (e.g. blur) testing tool can rely on the herein-described solutions to simultaneously depict distinct optotypes corresponding to respective optical resolving or corrective powers in providing a subjective basis for optical testing comparisons. These and other such applications will be described in further detail below. For instance, other light field display applications, such as 3D displays and the like, may also benefit from the solutions described herein, and thus, should be considered to fall within the general scope and nature of the present disclosure.

As noted above, the devices, displays and methods described herein may allow a user's perception of one or more input images (or input image portions), where each image or image portion is virtually located at a distinct image plane/depth location, to be adjusted or altered using the light field display. These may be used, as described below, to provide vision correction for a user viewing digital displays, but the same light field displays and rendering technology, as detailed below and according to different embodiments, may equally be used or be implemented in a refractor or phoropter-like device to test, screen, diagnose and/or deduce a patient's reduced visual acuity. In accordance with some embodiments, different vision testing devices and systems as described herein may be contemplated so to replace or complement traditional vision testing devices such as refractors and/or phoropters, in which traditional devices different optotypes are shown to a user in sequence via changing and/or compounding optical elements (lenses, prisms, etc.) so to identify an optical combination that best improves the user's perception of these displayed optotypes. As will be described in greater detail below, embodiments as described herein introduce light field display technologies and image rendering techniques, alone or in combination with complementary optical elements such as refractive lens, prisms, etc., to provide, amongst other benefits, for greater vision testing versatility, compactness, portability, range, precision, and/or other benefits as will be readily appreciated by the skilled artisan. Accordingly, while the terms light field refractor or phoropter will be used interchangeably herein to reference the implementation of different embodiments of a more generally defined light field vision testing device and system, the person of ordinary skill in the art will appreciate the versatility of the herein described implementation of light field rendering techniques, and ray tracing approaches detailed herein with respect to some embodiments, in the provision of effective light field vision testing devices and systems in general.

Embodiments can be dynamically controlled to progressively adjust a user's perception of rendered images or image portions (e.g. optotype within the context of a blur test for example) until an optimized correction is applied that optimizes the user's perception. Perception adjustment parameters used to achieve this optimized perception can then be translated into a proposed vision correction prescription to be applied to corrective eyewear. Conversely, a user's vision correction eyewear prescription can be used as input to dictate selection of applied vision correction parameters and related image perception adjustment, to validate or possibly further fine tune the user's prescription, for example, and progressively adjusting such correction parameters to test for the possibility of a further improvement. As noted above, embodiments are not to be limited as such as the notions and solutions described herein may also be applied to other technologies in which a user's perception of an input image to be displayed can be altered or adjusted via the light field display. However, for the sake of illustration, a number of the herein described embodiments will be described as allowing for implementation of digitally adaptive vision tests such that individuals with such reduced visual acuity can be exposed to distinct perceptively adjusted versions of an input image(s) (e.g. optotypes) to subjectively ascertain a potentially required or preferred vision correction.

Generally, digital displays as considered herein will comprise a set of image rendering pixels and a corresponding set of light field shaping elements that at least partially govern a light field emanated thereby to produce a perceptively adjusted version of the input image, notably distinct perceptively adjusted portions of an input image or input scene, which may include distinct portions of a same image, a same 2.5D/3D scene, or distinct images (portions) associated with different image depths, effects and/or locations and assembled into a combined visual input. For simplicity, the following will generally consider distinctly addressed portions or segments as distinct portions of an input image, whether that input image comprises a singular image having distinctly characterized portions, a digital assembly of distinctly characterized images, overlays, backgrounds, foregrounds or the like, or any other such digital image combinations.

In some examples, light field shaping elements may take the form of a light field shaping layer or like array of optical elements to be disposed relative to the display pixels in at least partially governing the emanated light field. As described in further detail below, such light field shaping layer elements may take the form of a microlens and/or pinhole array, or other like arrays of optical elements, or again take the form of an underlying light shaping layer, such as an underlying array of optical gratings or like optical elements operable to produce a directional pixelated output.

Within the context of a light field shaping layer, as described in further detail below in accordance with some embodiments, the light field shaping layer can be disposed at a pre-set distance from the pixelated display so to controllably shape or influence a light field emanating therefrom. For instance, each light field shaping layer can be defined by an array of optical elements centered over a corresponding subset of the display's pixel array to optically influence a light field emanating therefrom and thereby govern a projection thereof from the display medium toward the user, for instance, providing some control over how each pixel or pixel group will be viewed by the viewer's eye(s). In some of the herein described embodiments, a vibrating LFSL can result in designation of these corresponding subsets of pixels to vary or shift slightly during any given vibration, for instance, by either allowing some otherwise obscured or misaligned pixels to at least partially align with a given LFSL element, or again, to improve an optical alignment thereof so to effectively impact and/or improve illumination thereby of the viewer's pupil in positively contributing to an improved adjusted image perception by the viewer.

As will be further detailed below, a LFSL vibration may encompass different displacement or motion cycles of the LFSL relative to the underlying display pixels, such as linear longitudinal, lateral, or diagonal motions or oscillations, two-dimensional circular, bi-directional, elliptical motions or cycles, and/or other such motions or oscillations which may further include three-dimensional vibrations as may be practical within a particular context or application.

As will be further detailed below, arrayed optical elements may include, but are not limited to, lenslets, microlenses or other such diffractive optical elements that together form, for example, a lenslet array; pinholes or like apertures or windows that together form, for example, a parallax or like barrier; concentrically patterned barriers, e.g. cut outs and/or windows, such as a to define a Fresnel zone plate or optical sieve, for example, and that together form a diffractive optical barrier (as described, for example, in Applicant's co-pending U.S. application Ser. No. 15/910,908, the entire contents of which are hereby incorporated herein by reference; and/or a combination thereof, such as for example, a lenslet array whose respective lenses or lenslets are partially shadowed or barriered around a periphery thereof so to combine the refractive properties of the lenslet with some of the advantages provided by a pinhole barrier.

In operation, the display device will also generally invoke a hardware processor operable on image pixel (or subpixel) data for an image to be displayed to output corrected or adjusted image pixel data to be rendered as a function of a stored characteristic of the light field shaping elements and/or layer, e.g. layer distance from display screen, distance between optical elements (pitch), absolute relative location of each pixel or subpixel to a corresponding optical element, properties of the optical elements (size, diffractive and/or refractive properties, etc.), or other such properties, and a selected vision correction or adjustment parameter related to the user's reduced visual acuity, intended viewing experience or other image perception adjustment parameter as may be the case given the application at hand. While the following examples will focus on the implementation of vision testing and/or correction solutions and applications, it will be appreciated that the herein described embodiments are not intended to be limited as such, and that other image perception adjustments may also be considered herein without departing from the general scope and nature of the present disclosure.

While light field display characteristics will generally remain static for a given implementation (i.e. a given shaping element and/or layer will be used and set for each device irrespective of the user), image processing can, in some embodiments, be dynamically adjusted as a function of the user's visual acuity or intended application so to actively adjust a distance of a virtual image plane, or perceived image on the user's retinal plane given a quantified user eye focus or like optical aberration(s), induced upon rendering the corrected/adjusted image pixel data via the static optical layer and/or elements, for example, or otherwise actively adjust image processing parameters as may be considered, for example, when implementing a viewer-adaptive pre-filtering algorithm or like approach (e.g. compressive light field optimization), so to at least in part govern an image perceived by the user's eye(s) given pixel or subpixel-specific light visible thereby through the layer.

Accordingly, a given device may be adapted to compensate for different visual acuity levels and thus accommodate different users and/or uses. For instance, a particular device may be configured to implement and/or render an interactive graphical user interface (GUI) that incorporates a dynamic vision correction scaling function that dynamically adjusts one or more designated vision correction parameter(s) in real-time in response to a designated user interaction therewith via the GUI. For example, a dynamic vision correction scaling function may comprise a graphically rendered scaling function controlled by a (continuous or discrete) user slide motion or like operation, whereby the GUI can be configured to capture and translate a user's given slide motion operation to a corresponding adjustment to the designated vision correction parameter(s) scalable with a degree of the user's given slide motion operation. These and other examples are described in Applicant's co-pending U.S. patent application Ser. No. 15/246,255, the entire contents of which are hereby incorporated herein by reference.

With reference to FIG. 1, and in accordance with one embodiment, a digital display device, generally referred to using the numeral 100, will now be described. In this example, the device 100 is generally depicted as a smartphone or the like, though other devices encompassing a graphical display may equally be considered, such as tablets, e-readers, watches, televisions, GPS devices, laptops, desktop computer monitors, televisions, smart televisions, handheld video game consoles and controllers, vehicular dashboard and/or entertainment displays, and the like.

In the illustrated embodiment, the device 100 comprises a processing unit 110, a digital display 120, and internal memory 130. Display 120 can be an LCD screen, a monitor, a plasma display panel, an LED or OLED screen, or any other type of digital display defined by a set of pixels for rendering a pixelated image or other like media or information. Internal memory 130 can be any form of electronic storage, including a disk drive, optical drive, read-only memory, random-access memory, or flash memory, to name a few examples. For illustrative purposes, memory 130 has stored in it vision correction or like image perception adjustment application 140, though various methods and techniques may be implemented to provide computer-readable code and instructions for execution by the processing unit in order to process pixel data for an image to be rendered in producing corrected pixel data amenable to producing a corrected image accommodating the user's reduced visual acuity (e.g. stored and executable image correction application, tool, utility or engine, etc.). Other components of the electronic device 100 may optionally include, but are not limited to, one or more rear and/or front-facing camera(s) 150, an accelerometer 160 and/or other device positioning/orientation devices capable of determining the tilt and/or orientation of electronic device 100, and the like.

For example, the electronic device 100, or related environment (e.g. within the context of a desktop workstation, vehicular console/dashboard, gaming or e-learning station, multimedia display room, etc.) may include further hardware, firmware and/or software components and/or modules to deliver complementary and/or cooperative features, functions and/or services. For example, in some embodiment, and as will be described in greater detail below, a pupil/eye tracking system may be integrally or cooperatively implemented to improve or enhance corrective image rending by tracking a location of the user's eye(s)/pupil(s) (e.g. both or one, e.g. dominant, eye(s)) and adjusting light field corrections accordingly. For instance, the device 100 may include, integrated therein or interfacing therewith, one or more eye/pupil tracking light sources, such as one or more infrared (IR) or near-IR (NIR) light source(s) to accommodate operation in limited ambient light conditions, leverage retinal retro-reflections, invoke corneal reflection, and/or other such considerations. For instance, different IR/NIR pupil tracking techniques may employ one or more (e.g. arrayed) directed or broad illumination light sources to stimulate retinal retro-reflection and/or corneal reflection in identifying a tracking a pupil location. Other techniques may employ ambient or IR/NIR light-based machine vision and facial recognition techniques to otherwise locate and track the user's eye(s)/pupil(s). To do so, one or more corresponding (e.g. visible, IR/NIR) cameras may be deployed to capture eye/pupil tracking signals that can be processed, using various image/sensor data processing techniques, to map a 3D location of the user's eye(s)/pupil(s). In the context of a mobile device, such as a mobile phone, such eye/pupil tracking hardware/software may be integral to the device, for instance, operating in concert with integrated components such as one or more front facing camera(s), onboard IR/NIR light source(s) and the like. In other user environments, such as in a vehicular environment, eye/pupil tracking hardware may be further distributed within the environment, such as dash, console, ceiling, windshield, mirror or similarly-mounted camera(s), light sources, etc.

Figure 2A:
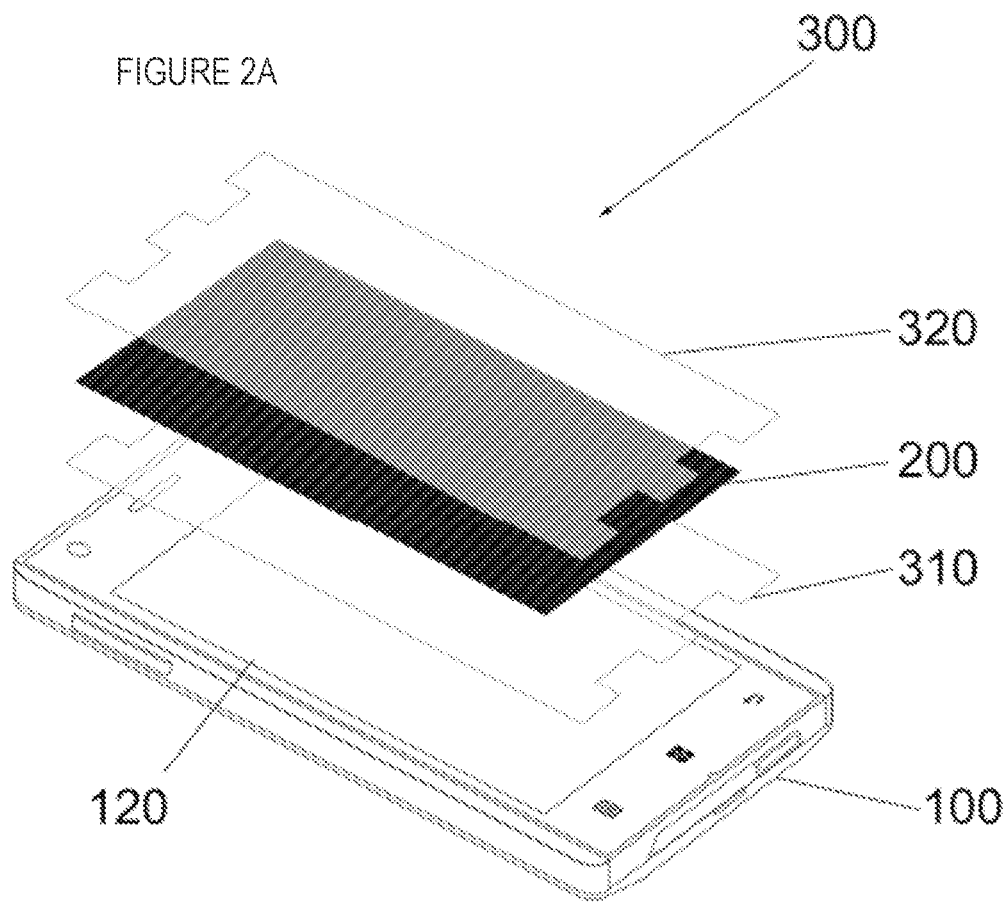
FIGS. 2A and 2B are exploded and side views, respectively, of an assembly of a light field display for an electronic device, in accordance with one embodiment.
Figure 2B:
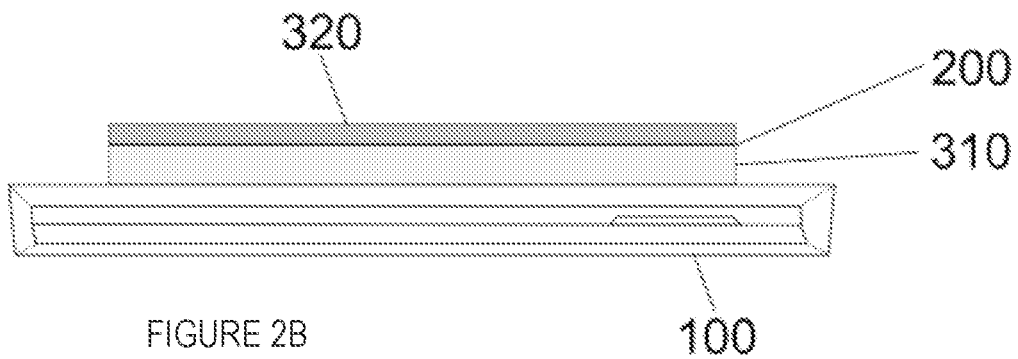

With reference to FIGS. 2A and 2B, the electronic device 100, such as that illustrated in FIG. 1, is further shown to include a light field shaping layer 200 overlaid atop a display 120 thereof and spaced therefrom via a transparent spacer 310 or other such means as may be readily apparent to the skilled artisan. A thickness or overall shape of the light field shaping layer may otherwise be directly manufactured to provide a desired distance or arrangement of the light field shaping layer elements thereof relative to the display's pixels. An optional transparent screen protector is also included atop the layer 200.

For the sake of illustration, the following embodiments will be described within the context of a light field shaping layer defined, at least in part, by a lenslet array comprising an array of microlenses (also interchangeably referred to herein as lenslets) that are each disposed at a distance from a corresponding subset of image rendering pixels in an underlying digital display. It will be appreciated that while a light field shaping layer may be manufactured and disposed as a digital screen overlay, other integrated concepts may also be considered, for example, where light field shaping elements are integrally formed or manufactured within a digital screen's integral components such as a textured or masked glass plate, beam-shaping light sources (e.g. directional light sources and/or backlit integrated optical grating array) or like component.

Accordingly, each lenslet will predictively shape light emanating from these pixel subsets to at least partially govern light rays being projected toward the user by the display device. As noted above, other light field shaping layers may also be considered herein without departing from the general scope and nature of the present disclosure, whereby light field shaping will be understood by the person of ordinary skill in the art to reference measures by which light, that would otherwise emanate indiscriminately (i.e. isotropically) from each pixel group, is deliberately controlled to define predictable light rays that can be traced between the user and the device's pixels through the shaping layer.

For greater clarity, a light field is generally defined as a vector function that describes the amount of light flowing in every direction through every point in space. In other words, anything that produces or reflects light has an associated light field. The embodiments described herein produce light fields from an object that are not "natural" vector functions one would expect to observe from that object. This gives it the ability to emulate the "natural" light fields of objects that do not physically exist, such as a virtual display located far behind the light field display, which will be referred to now as the 'virtual image'. As noted in the examples below, in some embodiments, lightfield rendering may be adjusted to effectively generate a virtual image on a virtual image plane that is set at a designated distance from an input user pupil location, for example, so to effectively push back, or move forward, a perceived image relative to the display device in accommodating a user's reduced visual acuity (e.g. minimum or maximum viewing distance). In yet other embodiments, lightfield rendering may rather or alternatively seek to map the input image on a retinal plane of the user, taking into account visual aberrations, so to adaptively adjust rendering of the input image on the display device to produce the mapped effect. Namely, where the unadjusted input image would otherwise typically come into focus in front of or behind the retinal plane (and/or be subject to other optical aberrations), this approach allows to map the intended image on the retinal plane and work therefrom to address designated optical aberrations accordingly. Using this approach, the device may further computationally interpret and compute virtual image distances tending toward infinity, for example, for extreme cases of presbyopia. This approach may also more readily allow, as will be appreciated by the below description, for adaptability to other visual aberrations that may not be as readily modeled using a virtual image and image plane implementation. In both of these examples, and like embodiments, the input image is digitally mapped to an adjusted image plane (e.g. virtual image plane or retinal plane) designated to provide the user with a designated image perception adjustment that at least partially addresses designated visual aberrations. Naturally, while visual aberrations may be addressed using these approaches, other visual effects may also be implemented using similar techniques.

Figure 3A:
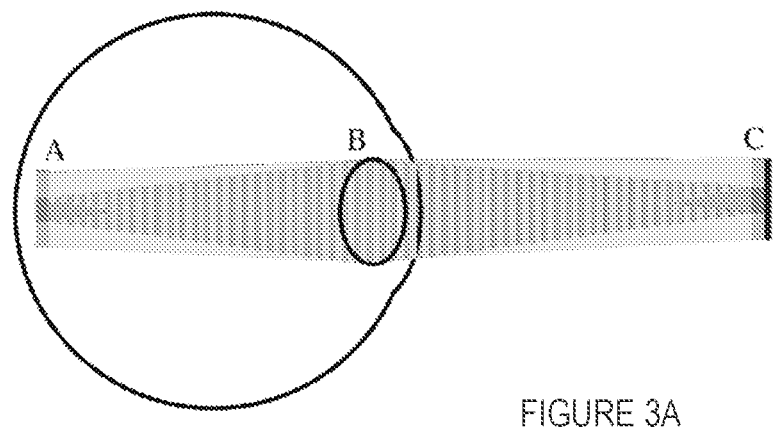
FIGS. 3A, 3B and 3C schematically illustrate normal vision, blurred vision, and corrected vision in accordance with one embodiment, respectively.
Figure 3B:
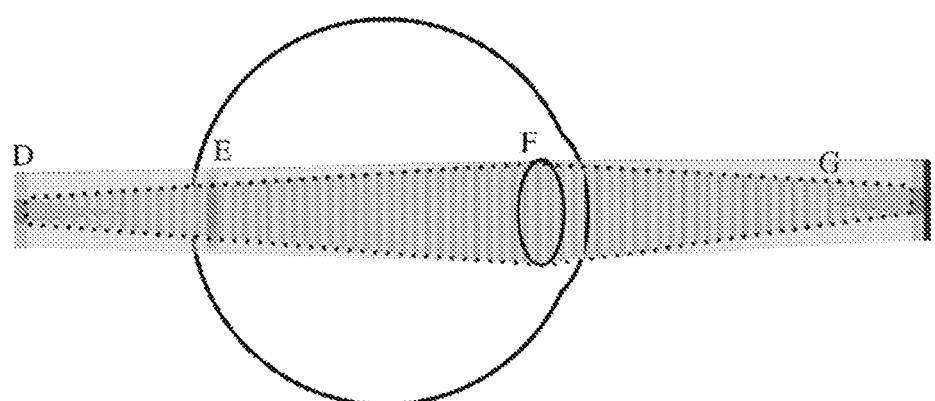

In one example, to apply this technology to vision correction, consider first the normal ability of the lens in an eye, as schematically illustrated in FIG. 3A, where, for normal vision, the image is to the right of the eye (C) and is projected through the lens (B) to the retina at the back of the eye (A). As comparatively shown in FIG. 3B, the poor lens shape (F) in presbyopia causes the image to be focused past the retina (D) forming a blurry image on the retina (E). The dotted lines outline the path of a beam of light (G). Naturally, other visual aberrations can and will have different impacts on image formation on the retina. To address these aberrations, a light field display (K), in accordance with some embodiments, projects the correct sharp image (H) to the back of the retina for an eye with a lens which otherwise could not adjust sufficiently to produce a sharp image. The other two light field pixels (I) and (J) are drawn lightly, but would otherwise fill out the rest of the image.

Figure 3C:
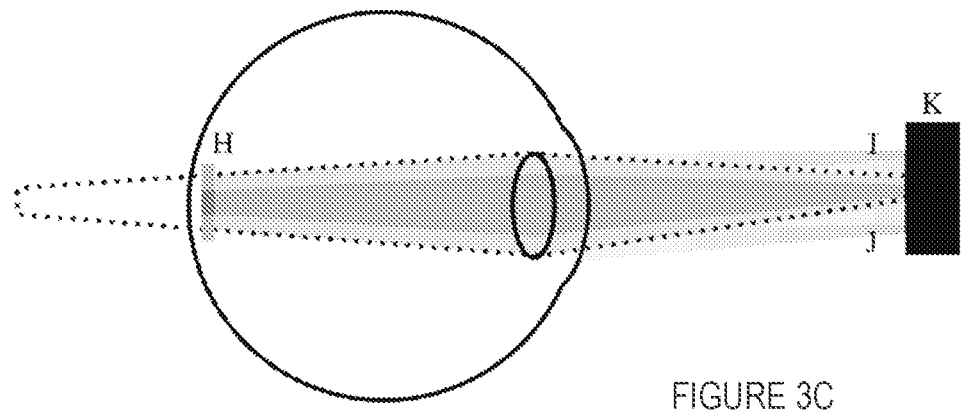

As will be appreciated by the skilled artisan, a light field as seen in FIG. 3C cannot be produced with a 'normal' two-dimensional display because the pixels' light field emits light isotropically. Instead it is necessary to exercise tight control on the angle and origin of the light emitted, for example, using a microlens array or other light field shaping layer such as a parallax barrier, or combination thereof.

Figure 4:
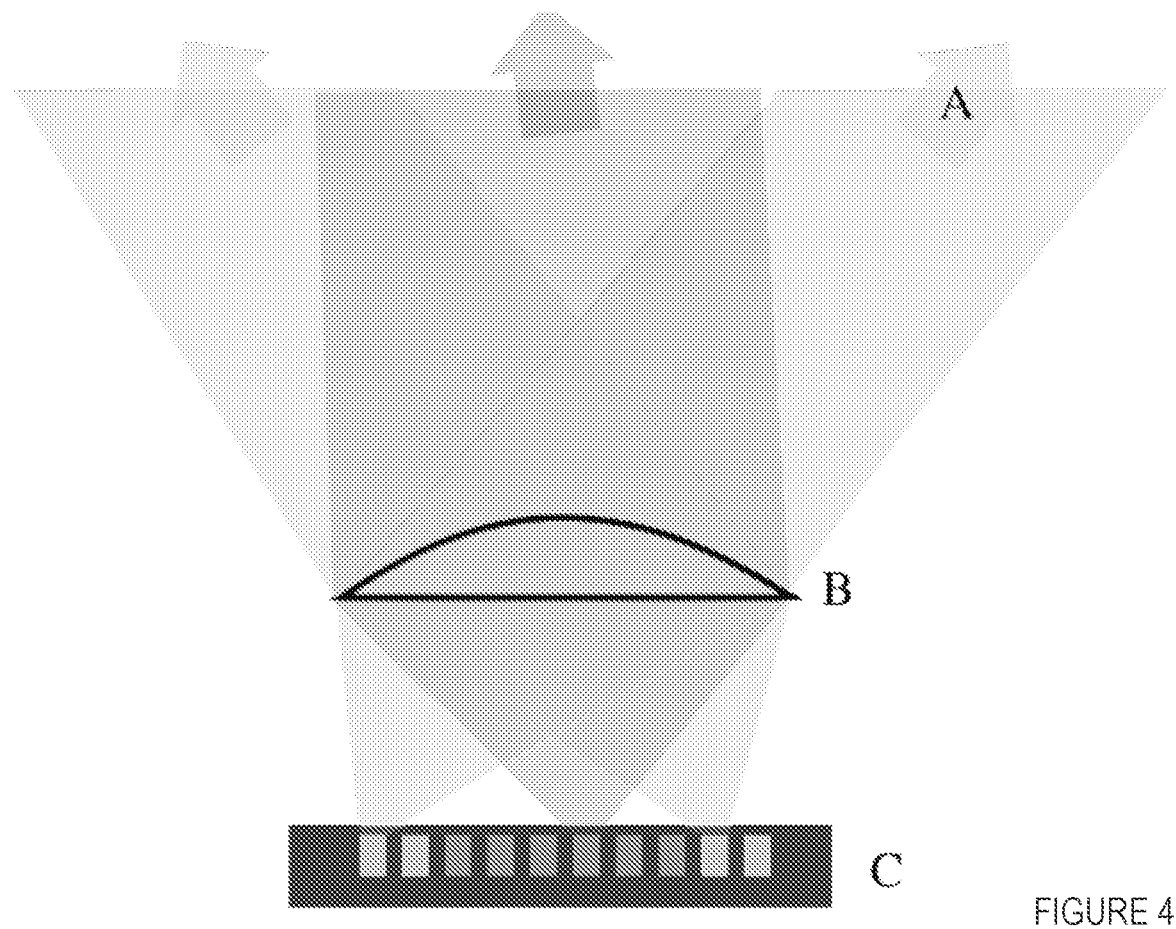
FIG. 4 is a schematic diagram of a single light field pixel defined by a convex lenslet or microlens overlaying an underlying pixel array and disposed at or near its focus to produce a substantially collimated beam, in accordance with one embodiment.

Following with the example of a microlens array, FIG. 4 schematically illustrates a single light field pixel defined by a convex microlens (B) disposed at its focus from a corresponding subset of pixels in an LCD display (C) to produce a substantially collimated beam of light emitted by these pixels, whereby the direction of the beam is controlled by the location of the pixel(s) relative to the microlens. The single light field pixel produces a beam similar to that shown in FIG. 3C where the outside rays are lighter and the majority inside rays are darker. The LCD display (C) emits light which hits the microlens (B) and it results in a beam of substantially collimated light (A).

Figure 5:
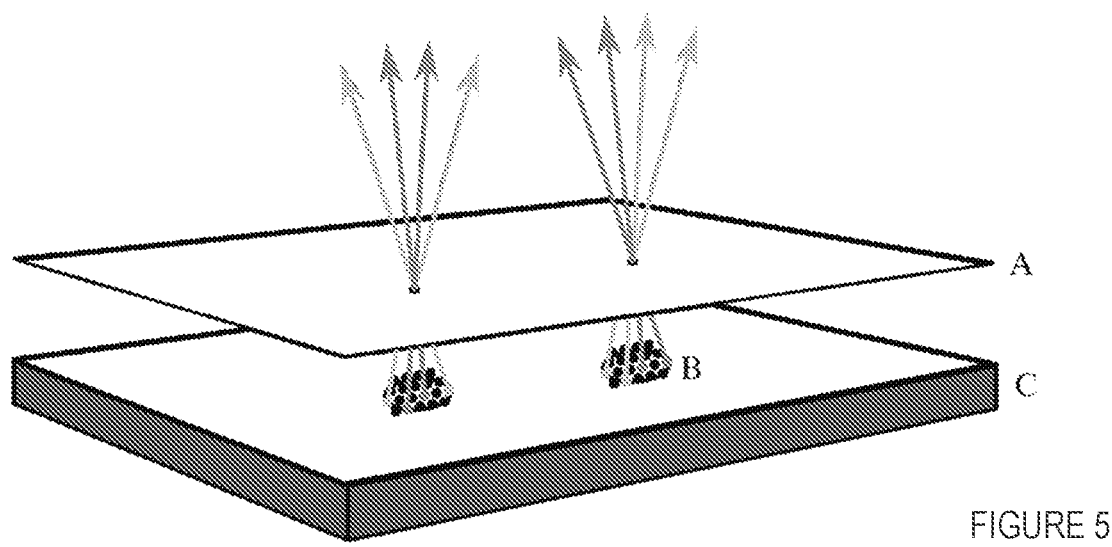
FIG. 5 is another schematic exploded view of an assembly of a light field display in which respective pixel subsets are aligned to emit light through a corresponding microlens or lenslet, in accordance with one embodiment.
Figure 6:
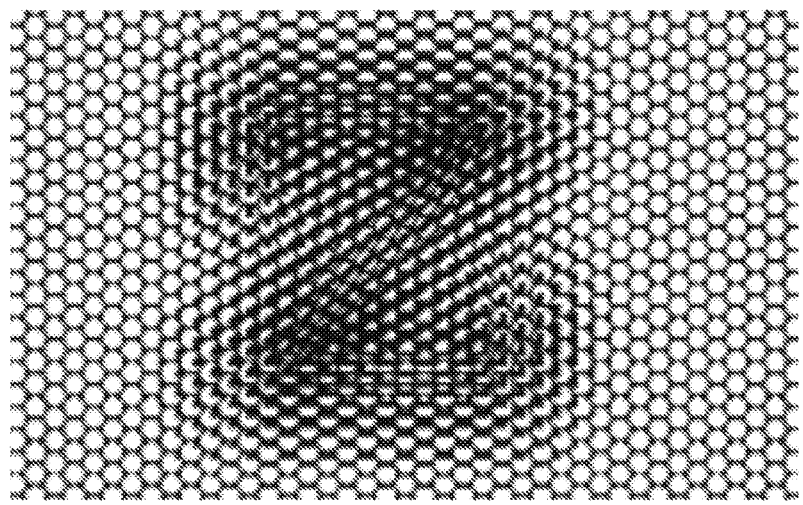
FIG. 6 is an exemplary diagram of a light field pattern that, when properly projected by a light field display, produces a corrected image exhibiting reduced blurring for a viewer having reduced visual acuity, in accordance with one embodiment.

Accordingly, upon predictably aligning a particular microlens array with a pixel array, a designated "circle" of pixels will correspond with each microlens and be responsible for delivering light to the pupil through that lens. FIG. 5 schematically illustrates an example of a light field display assembly in which a microlens array (A) sits above an LCD display on a cellphone (C) to have pixels (B) emit light through the microlens array. A ray-tracing algorithm can thus be used to produce a pattern to be displayed on the pixel array below the microlens in order to create the desired virtual image that will effectively correct for the viewer's reduced visual acuity. FIG. 6 provides an example of such a pattern for the letter "Z". Examples of such ray-tracing algorithms are discussed below.

As will be detailed further below, the separation between the microlens array and the pixel array as well as the pitch of the lenses can be selected as a function of various operating characteristics, such as the normal or average operating distance of the display, and/or normal or average operating ambient light levels.

Further, as producing a light field with angular resolution sufficient for accommodation correction over the full viewing 'zone' of a display would generally require an astronomically high pixel density, instead, a correct light field can be produced, in some embodiments, only at or around the location of the user's pupils. To do so, the light field display can be paired with pupil tracking technology to track a location of the user's eyes/pupils relative to the display. The display can then compensate for the user's eye location and produce the correct virtual image, for example, in real time.

In some embodiments, the light field display can render dynamic images at over 30 frames per second on the hardware in a smartphone.

In some embodiments, the light field display can display a virtual image at optical infinity, meaning that any level of accommodation-based presbyopia (e.g. first order) can be corrected for.

In some further embodiments, the light field display can both push the image back and forward, thus allowing for selective image corrections for both hyperopia (farsightedness) and myopia (nearsightedness). This will be further discussed below in the context of a light field vision testing (e.g. refractor/phoropter) device using the light field display.

In order to demonstrate a working light field solution, and in accordance with one embodiment, the following test was set up. A camera was equipped with a simple lens, to simulate the lens in a human eye and the aperture was set to simulate a normal pupil diameter. The lens was focused to 50 cm away and a phone was mounted 25 cm away. This would approximate a user whose minimal seeing distance is 50 cm and is attempting to use a phone at 25 cm.

Figure 7A:
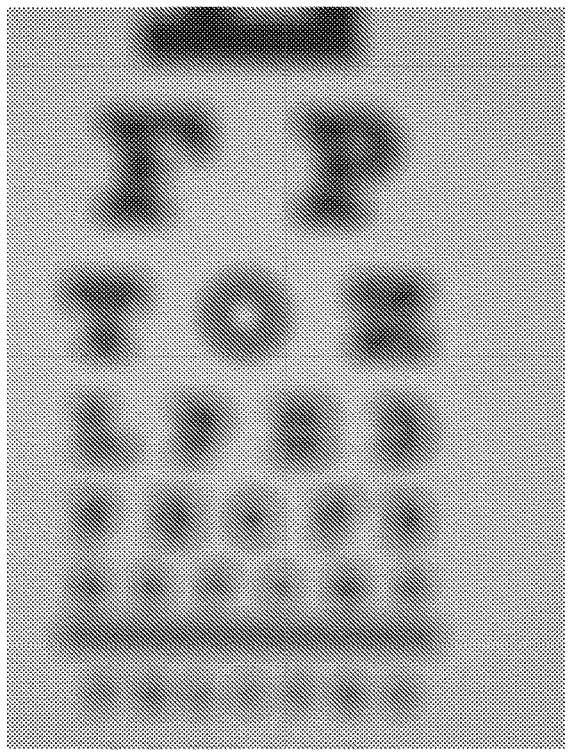
FIGS. 7A and 7B are photographs of a Snellen chart, as illustratively viewed by a viewer with reduced acuity without image correction (blurry image in FIG. 7A) and with image correction via a light field display (corrected image in FIG. 7B), in accordance with one embodiment.
Figure 7B:
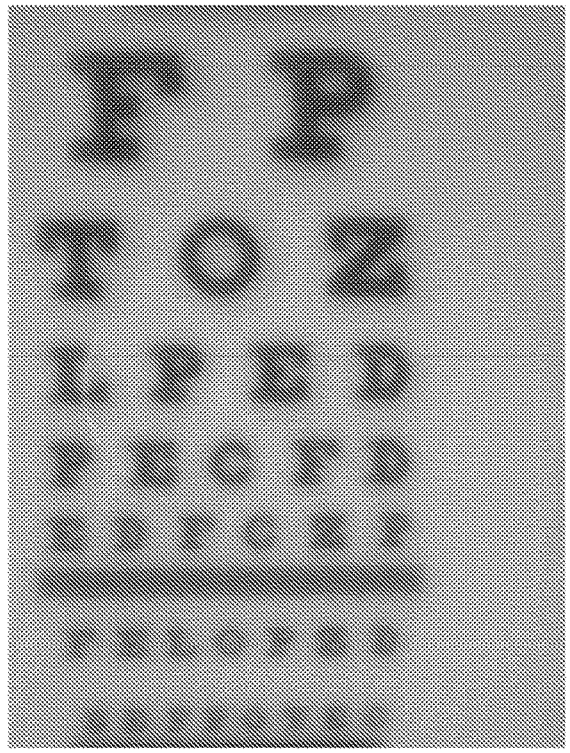

With reading glasses, +2.0 diopters would be necessary for the vision correction. A scaled Snellen chart was displayed on the cellphone and a picture was taken, as shown in FIG. 7A. Using the same cellphone, but with a light field assembly in front that uses that cellphone's pixel array, a virtual image compensating for the lens focus is displayed. A picture was again taken, as shown in FIG. 7B, showing a clear improvement.

Accordingly, a display device as described above and further exemplified below, can be configured to render a corrected image via the light field shaping layer that accommodates for the user's visual acuity. By adjusting the image correction in accordance with the user's actual predefined, set or selected visual acuity level, different users and visual acuity may be accommodated using a same device configuration. That is, in one example, by adjusting corrective image pixel data to dynamically adjust a virtual image distance below/above the display as rendered via the light field shaping layer, different visual acuity levels may be accommodated.

As will be appreciated by the skilled artisan, different image processing techniques may be considered, such as those introduced above and taught by Pamplona and/or Huang, for example, which may also influence other light field parameters to achieve appropriate image correction, virtual image resolution, brightness and the like.

Figure 8:
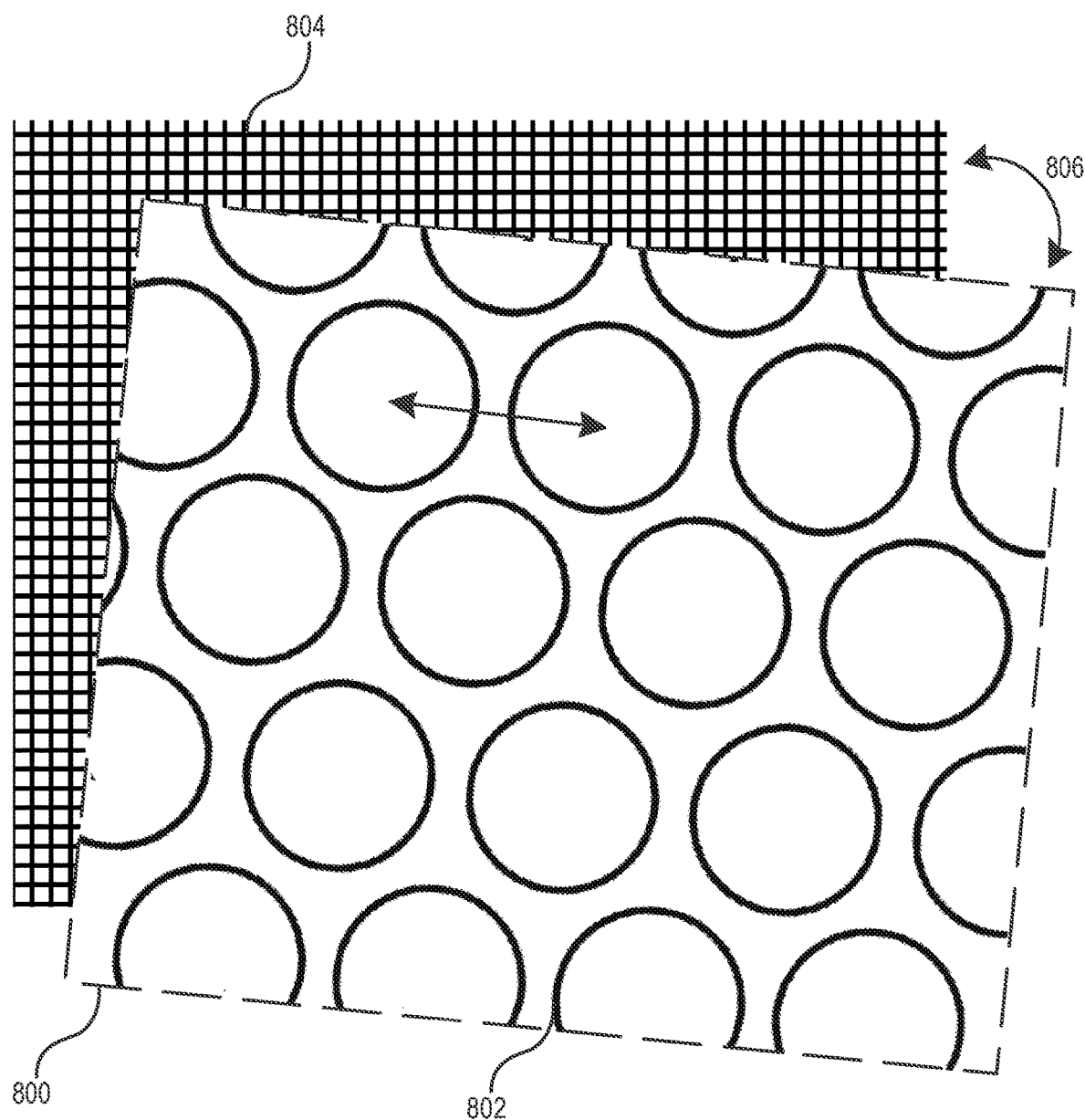
FIG. 8 is a schematic diagram of a portion of a hexagonal lenslet array disposed at an angle relative to an underlying pixel array, in accordance with one embodiment.

With reference to FIG. 8, and in accordance with one embodiment, an microlens array configuration will now be described, in accordance with another embodiment, to provide light field shaping elements in a corrective light field implementation. In this embodiment, the microlens array 800 is defined by a hexagonal array of microlenses 802 disposed so to overlay a corresponding square pixel array 804. In doing so, while each microlens 802 can be aligned with a designated subset of pixels to produce light field pixels as described above, the hexagonal-to-square array mismatch can alleviate certain periodic optical artifacts that may otherwise be manifested given the periodic nature of the optical elements and principles being relied upon to produce the desired optical image corrections. Conversely, a square microlens array may be favoured when operating a digital display comprising a hexagonal pixel array.

In some embodiments, as illustrated in FIG. 8, the microlens array 800 may further or alternatively overlaid at an angle 806 relative to the underlying pixel array, which can further or alternatively alleviate period optical artifacts.

In yet some further or alternative embodiments, a pitch ratio between the microlens array and pixel array may be deliberately selected to further or alternatively alleviate periodic optical artifacts. For example, a perfectly matched pitch ratio (i.e. an exact integer number of display pixels per microlens) is most likely to induce periodic optical artifacts, whereas a pitch ratio mismatch can help reduce such occurrences. Accordingly, in some embodiments, the pitch ratio will be selected to define an irrational number, or at least, an irregular ratio, so to minimize periodic optical artifacts. For instance, a structural periodicity can be defined so to reduce the number of periodic occurrences within the dimensions of the display screen at hand, e.g. ideally selected so to define a structural period that is greater than the size of the display screen being used.

However, as seen in FIG. 8, for any viewing angle, there may be some pixels of the pixel array that are located near the periphery of microlens 802 and for which emitted light may thus be, at least partially, attenuated or blocked, or at least, be positioned so not to effectively benefit from the light field shaping function of this microlens and thus, fail to effectively partake in the combined formation of an adjusted image output. Accordingly, this misalignment may have the effect of reducing the perceived resolution of the light field display when viewed by a user.

In one embodiment, accordingly, a light field display comprises a vibrating microlens array, which, in some implementations, may improve the perceived resolution and consequently provide for a better overall user experience.

Figure 9A:
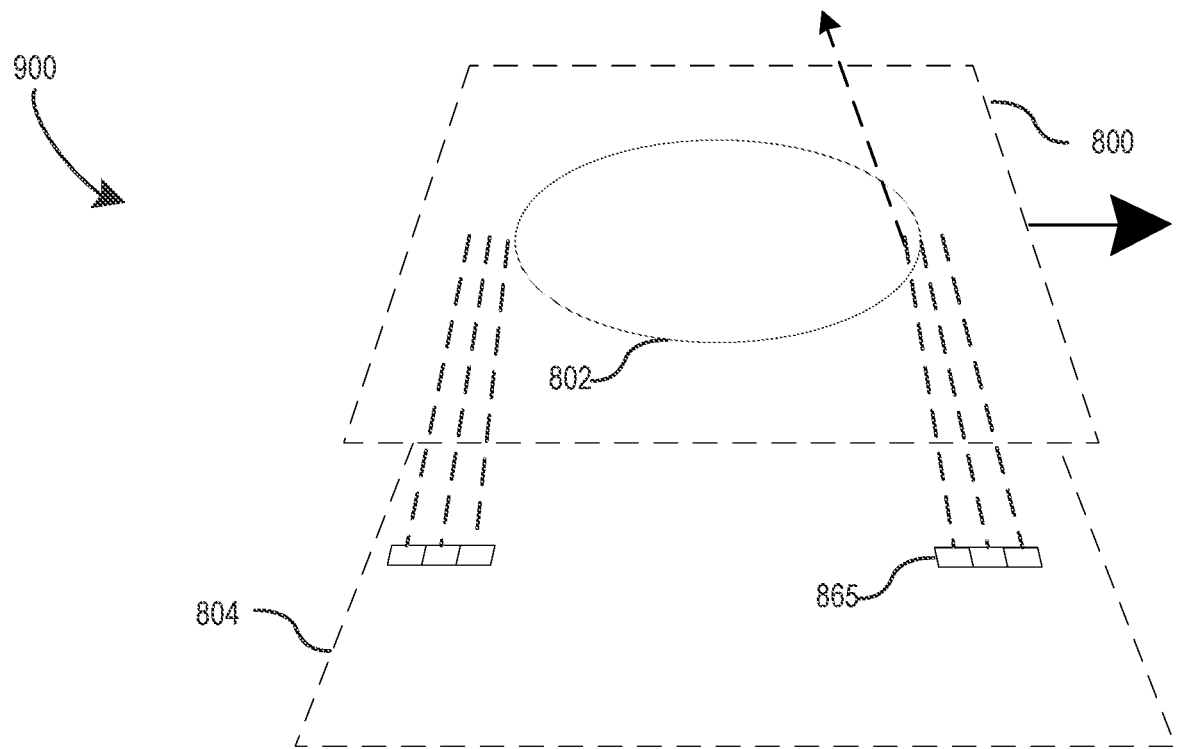
FIGS. 9A and 9B are schematic diagrams of an oscillating light field shaping layer element, such as a microlens or lenslet, overlaying a partially changing underlying set of pixels, in accordance with one embodiment.
Figure 9B:
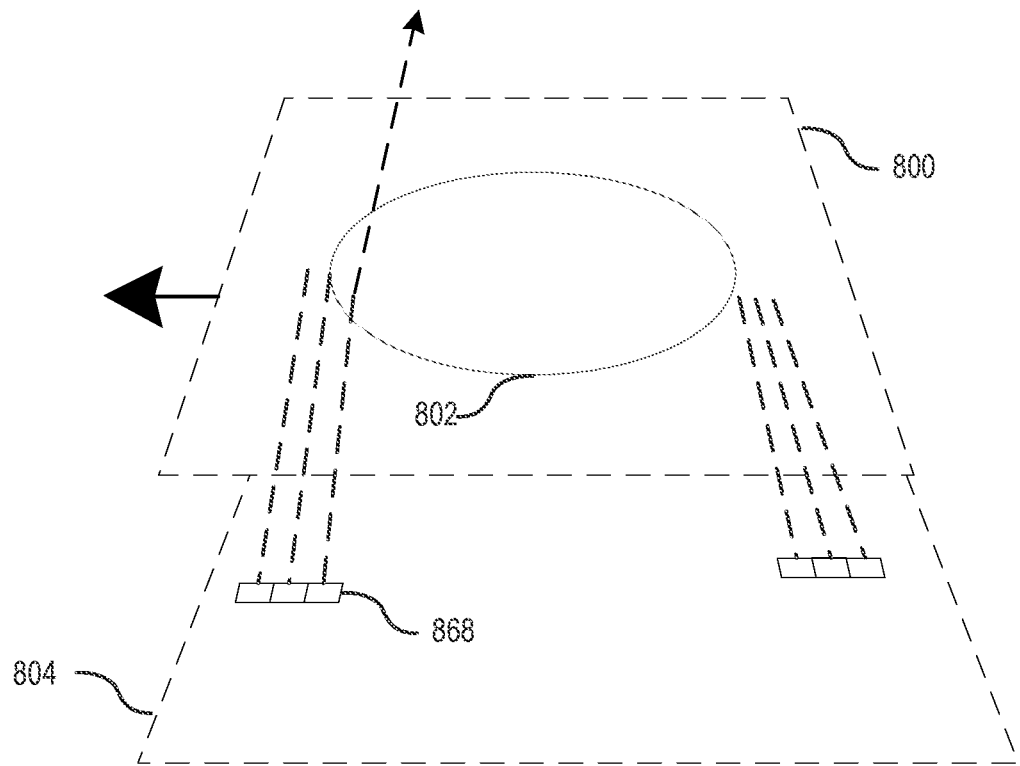

For example, as illustrated in FIGS. 9A and 9B in accordance with one embodiment, vibration means such as one or more actuators, drivers or similar may be attached or otherwise operatively coupled to microlens array 800 so as to rapidly oscillate or vibrate microlens 802 over a slightly different subset of pixels in display 804 over a given time period. FIGS. 9A and 9B show the microlens array being moved in a linear fashion further to the right (FIG. 9A) and to the left (FIG. 9B) along one of the principal axes of the underlying pixel array, so as to temporarily address additional pixels 865 and 868 respectively. The light rays emitted from these pixels in the direction of the user's pupil would otherwise have been obstructed or attenuated due to their relative position with respect to microlens 802 and the user's pupil, or in the case of transparent transition zones between pixels, fail to adequately benefit from the light field shaping function of the lenslet 802. Likewise, bordering pixels may, as a result of this vibration, benefit from improved alignment with their overlying lenslet and thus reduce optical aberrations related thereto. Other optical and resolution improvements may also be provided, as will be appreciated by the skilled artisan.

For instance, by rapidly moving or oscillating each microlens over the pixel array in a way that is generally too fast for the user to notice, it may be possible to add or better include a contribution from these pixels to the final image perceived by the user and thus increase the perceived resolution. While the user would not typically perceive the motion of the microlens array per se, they would perceive an aggregate of all the different microlens array positions during each cycle, for example, for each light field frame rendered (i.e. where a LFSL vibration frequency is equal or greater than, for example, 30 Hz, or again closer or even above a refresh rate of the display (e.g. 60 Hz, 120 Hz or beyond). It is generally understood that the microlens only need to be displaced over a small distance, which could be, for example, as small as the distance between two consecutive pixels in some embodiments (e.g. around 15 microns for a digital pixel display like the Sony™ Xperia™ XZ Premium phone with a reported screen resolution of 3840×2160 pixels with 16:9 ratio and approximately 807 pixel-per-inch (ppi) density).

While this example is provided within the context of a microlens array, similar structural design considerations may be applied within the context of a parallax barrier, diffractive barrier or combination thereof.

Figure 10A:
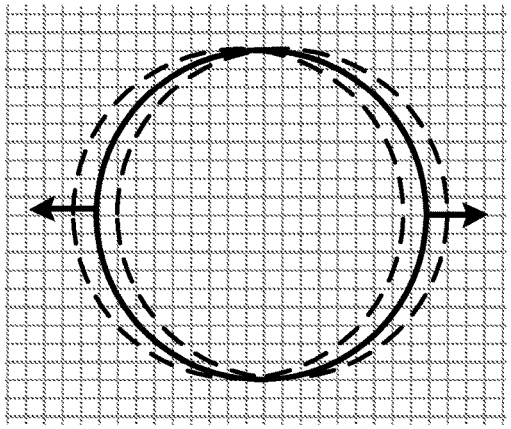
FIGS. 10A to 10E are schematic diagrams illustrating exemplary oscillatory motions of a light field shaping layer element, in accordance with one embodiment.
Figure 10B:
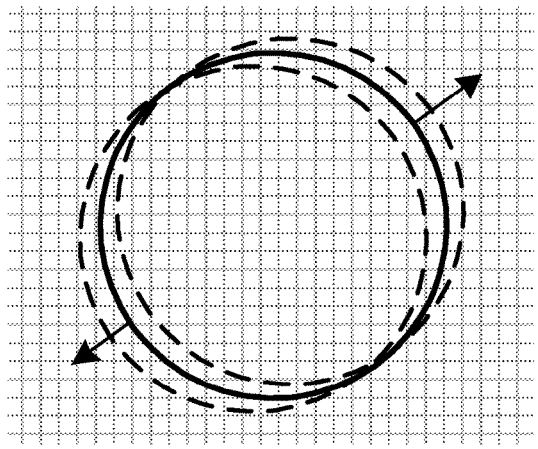
Figure 10C:
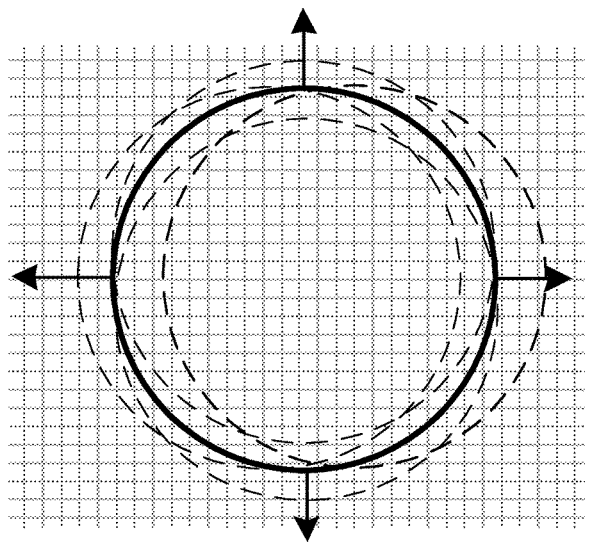
Figure 10D:
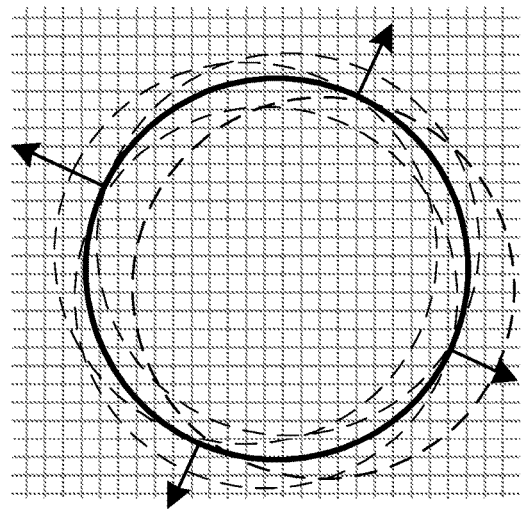
Figure 10E:
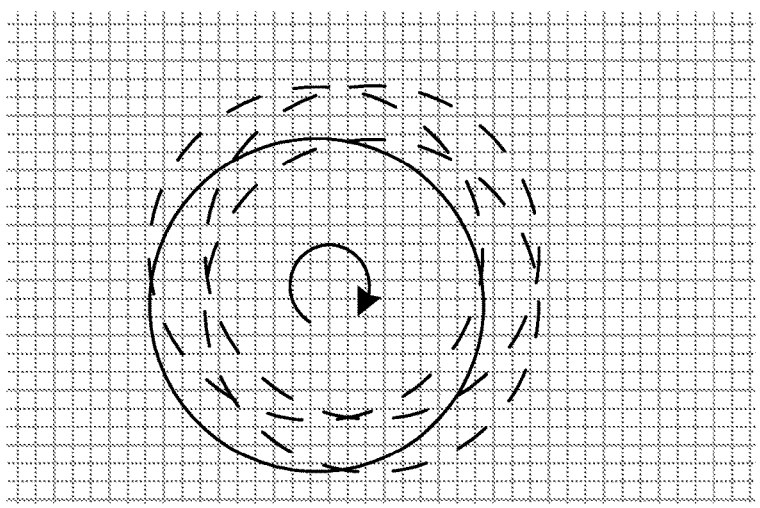

With respect to FIGS. 10A to 10E, and in accordance with one embodiment, different examples of microlens oscillatory motions are described. Each of these figures illustrate a relative motion of a microlens with respect to the underlying pixel array. Note that the relative displacement of the microlens array illustrated herewith with respect to the pixel array has been exaggerated for illustrative purposes only. As discussed above, the oscillatory motion may be a linear motion along one of the principal directions of the pixel array (e.g. along a row of pixels), as seen in FIG. 10A, or at an angle as seen in FIG. 10B. The microlens array may also be made to oscillate bidirectionally, for example along the principal directions of the pixel array, as seen in FIG. 10C, or again at an angle as seen in FIG. 10D. Furthermore, the motion may not be limited to linear motion, for example, as seen in FIG. 10E, circular or ellipsoidal oscillatory motions may be used.

Figure 11A:
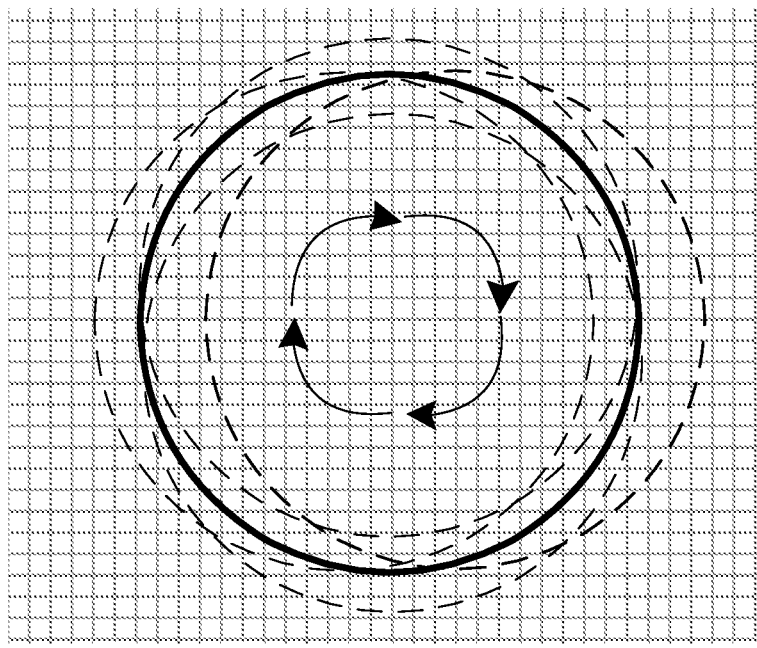
FIGS. 11A and 11B are schematic diagrams illustrating more complex exemplary oscillatory motions of a light field shaping layer element, in accordance with one embodiment.
Figure 11B:
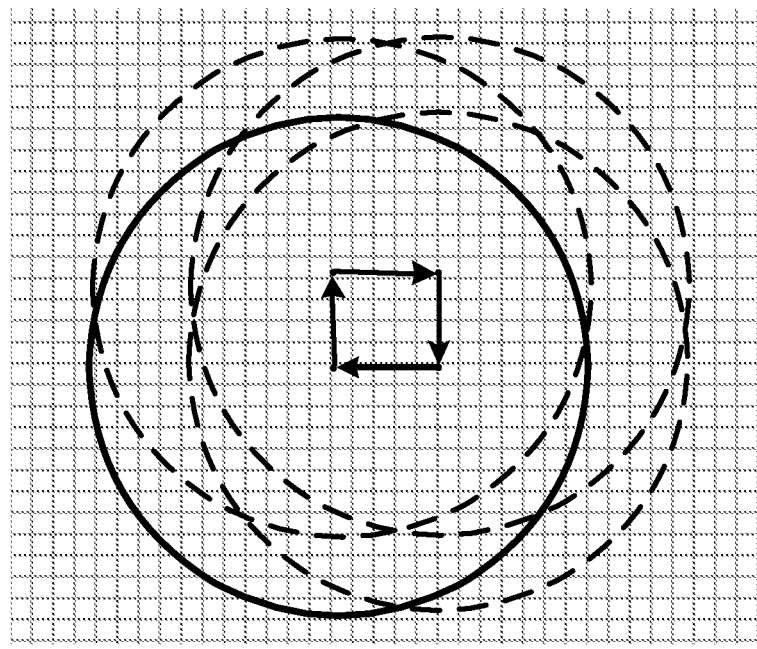

In some embodiments, as illustrated in FIGS. 11A and 11B, more complex oscillatory motions may be considered. For example, instead of a continuous oscillatory motion, as discussed above, the oscillations may be done in a step-wise fashion by moving rapidly the microlens array through a periodic ordered sequence of one or more intermediary positions. As discussed above, in some embodiments, these may also be timed or synchronized with the rendering algorithm so that at each frame each microlens is positioned at a one of the intermediary pre-determined location, or again, that each frame benefit from two or more of these intermediary positions. In the examples of FIGS. 11A and 11B, we see the motion of a single microlens over a pixel array, wherein the microlens is moved to three different locations over the pixel array before returning to its initial position. These displacements may be done in a sequence of linear intermediary displacements (FIG. 11B) or using circular or ellipsoidal displacements (FIG. 11A). These displacements need to be done fast enough so not to be perceived by the user. For example, in one embodiment, the microlens array may be positioned at each of the four different positions illustrated herein thirty times per second for a digital display refreshing at 120 Hz.

In some embodiments, the microlens array may also be made to oscillate perpendicularly to the pixel display, at least in part, by adding a depth component to the motion (e.g. going back and forth relative to the display).

In some embodiments, fast periodic motion or oscillations of the microlens array is provided via one or more actuators. Different types of actuators may include, for example, but are not limited to, piezoelectric transducers or motors like ultrasonic motors or the like. Other driving techniques may include, but are not limited to, electrostatic, magnetic, mechanical and/or other such physical drive techniques. One or more means may be affixed, attached or otherwise operatively coupled to the microlens array, at one or more locations, to ensure precise or predictable motion. In some embodiments, the actuators or the like may be integrated into the display's frame so as to not be visible by the user. In some embodiments, more complex oscillatory motions may be provided by combining two or more linear actuators/motors, for example.

In some embodiments, the actuators may be controlled via, for example, a control signal or similar. For example, square, triangular, or sinusoidal signals, and/or a combination thereof, may be used to drive the actuators or motors. In some embodiments, the control signal may be provided by the display's main processor, while in other cases, the system may use instead a second digital processor or microcontroller to control the actuators. In all cases, the oscillatory motion may be independent from or synchronized with the light field rendering algorithm discussed below.

Figure 12:
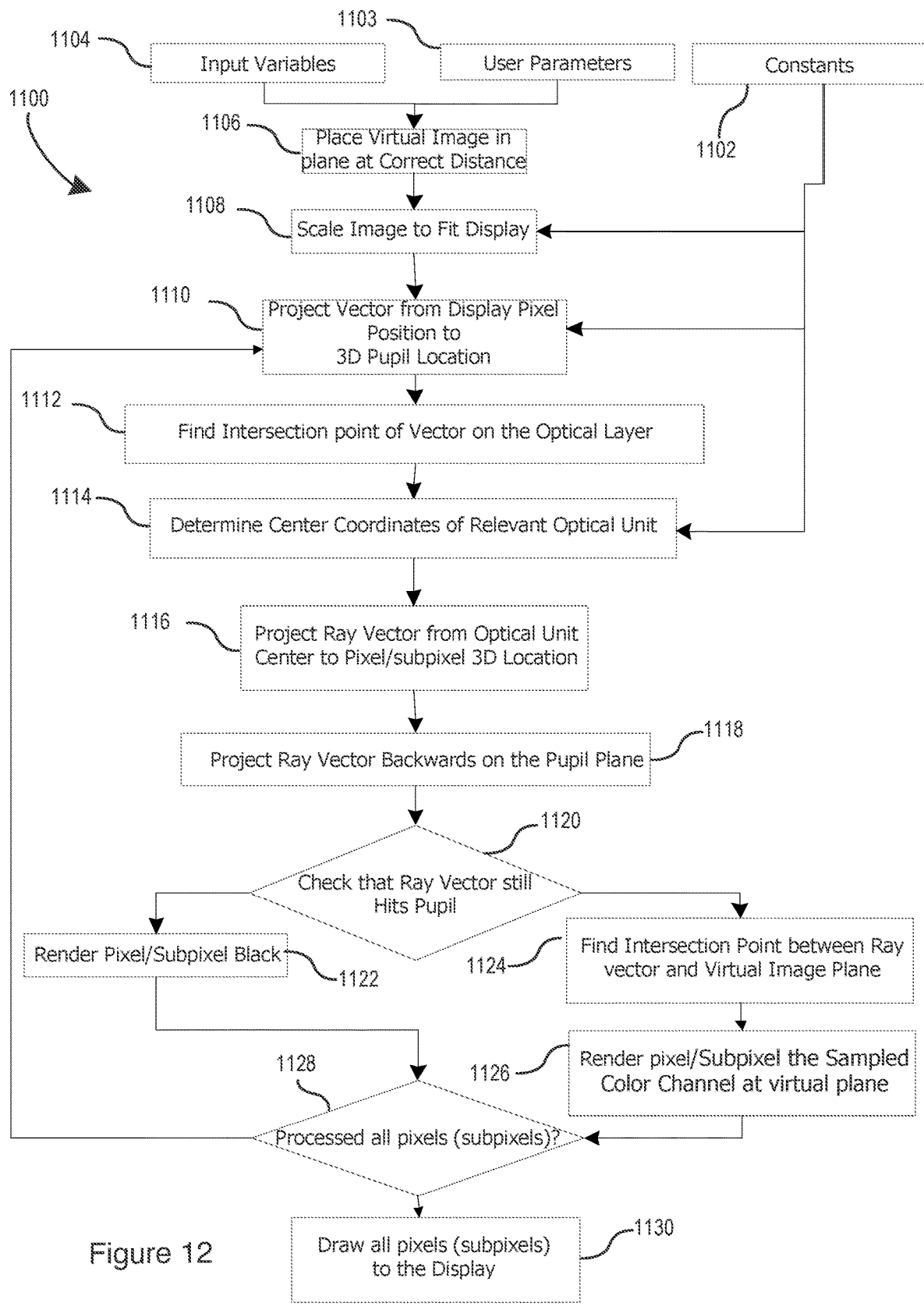
FIG. 12 is a process flow diagram of an illustrative ray-tracing rendering process, in accordance with one embodiment.
Figure 13:
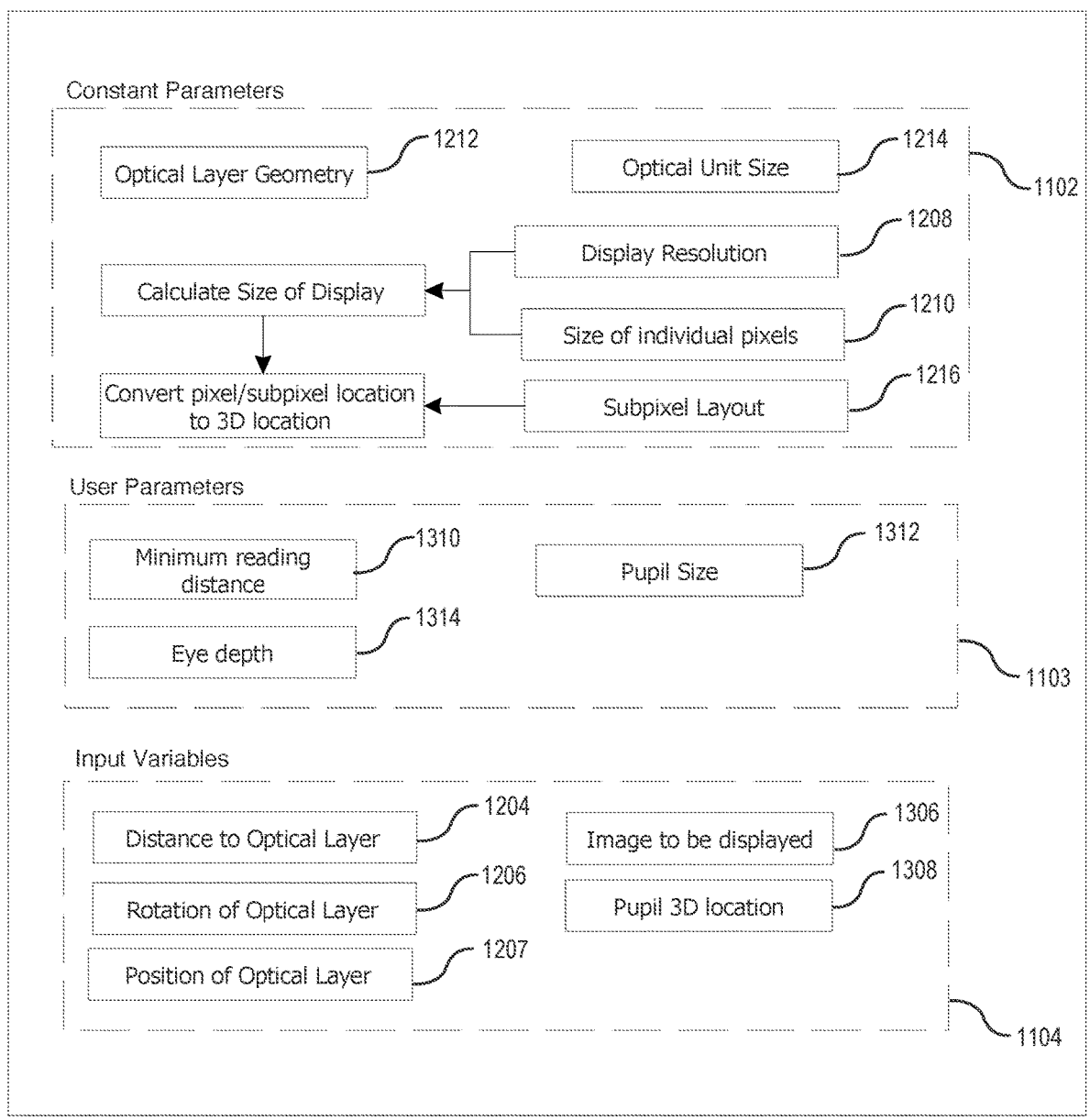
FIG. 13 is a process flow diagrams of exemplary input constant parameters, user parameters, and variables, respectively, for the ray-tracing rendering process of FIG. 12, in accordance with one embodiment.

With reference to FIGS. 12 and 13, and in accordance with one embodiment, an exemplary, computationally implemented, ray-tracing method for rendering an adjusted image perception via an oscillating light field shaping layer (LFSL), for example a computationally corrected image that accommodates for the user's reduced visual acuity, will now be described. In this exemplary embodiment, a set of constant parameters 1102 and user parameters 1103 may be pre-determined. The constant parameters 1102 may include, for example, any data which are generally based on the physical and functional characteristics of the display (e.g. specifications, etc.) for which the method is to be implemented, as will be explained below. The user parameters 1103 may include any data that are generally linked to the user's physiology and which may change between two viewing sessions, either because different users may use the device or because some physiological characteristics have changed themselves over time. Similarly, every iteration of the rendering algorithm may use a set of input variables 1104 which are expected to change at each rendering iteration.

As illustrated in FIG. 13, the list of constant parameters 1102 may include, without limitations, the display resolution 1208, the size of each individual pixel 1210, the optical LFSL geometry 1212, the size of each optical element 1214 within the LFSL and optionally the subpixel layout 1216 of the display. Moreover, both the display resolution 1208 and the size of each individual pixel 1210 may be used to pre-determine both the absolute size of the display in real units (i.e. in mm) and the three-dimensional position of each pixel within the display. In some embodiments where the subpixel layout 1216 is available, the position within the display of each subpixel may also be pre-determined. These three-dimensional location/positions are usually calculated using a given frame of reference located somewhere within the plane of the display, for example a corner or the middle of the display, although other reference points may be chosen. Concerning the optical layer geometry 1212, different geometries may be considered, for example a hexagonal geometry such as the one shown in FIG. 8.

In FIG. 13, we also find an exemplary set of user parameters 1103 for method 110, which includes any data that may change between sessions or even during a session but is not expected to change in-between each iteration of the rendering algorithm. These generally comprise any data representative of the user's reduced visual acuity or condition, for example, without limitation, the minimum reading distance 1310, the eye depth 1314 and an optional pupil size 1312. In the illustrated embodiment, the minimum reading distance 1310 is defined as the minimal focus distance for reading that the user's eye(s) may be able to accommodate (i.e. able to view without discomfort). In some embodiments, different values of the minimum reading distance 1310 associated with different users may be entered, for example, as can other adaptive vision correction parameters be considered depending on the application at hand and vision correction being addressed. In some embodiments, the minimum reading distance 1310 may also change as a function of the time of day (e.g. morning vs evening).

FIG. 13 further illustratively lists an exemplary set of input variables 1104 for method 1100, which may include any input data fed into method 1100 that is expected to change rapidly in-between different rendering iterations, and may thus include without limitation: the image(s) to be displayed 1306 (e.g. pixel data such as on/off, colour, brightness, etc.), and any LFSL characteristics which may be affected by the rapid oscillatory motion of the LFSL, for example the distance 1204 between the display and the LFSL, the in-plane rotation angle 1206 between the display and LFSL frames of reference and the relative position of the LFSL with respect to the underlying pixel array 1207. In the case where any of these variables are static (e.g. not oscillating) they should then be considered constant parameters. In some embodiments wherein the oscillating microlens array and the light field rendering algorithm act independently of each other, the rendering algorithm may use for parameters 1204, 1206 and 1207 a single value representative of a single position of each microlens along the periodic trajectory, or use an averaged position/angle/distance along a full period, for example. By combining the distance 1204, the rotation angle 1206, and the geometry 1212 with the optical element size 1214, it is possible to similarly determine at every iteration the three-dimensional location/position of each optical element center with respect to the display's same frame of reference.

The image data 1306, for example, may be representative of one or more digital images to be displayed with the digital pixel display. This image may generally be encoded in any data format used to store digital images known in the art. In some embodiments, images 1306 to be displayed may change at a given framerate.

As discussed above, in some embodiments, the actuators may be programmed in advance so that the motion (e.g. any or all of position 1204, rotation angle 1206 or position 1207) of the microlens array may be, for example, synchronized with the pixel display refresh rate. In other embodiments, the control signal may be tuned and changed during operation using a calibration procedure. In other embodiments, additional sensors may be deployed, such as photodiodes or the like to precisely determine the relative position of the microlens array as a function of time. Thus, in the event that the microlens array is slightly misaligned with respect to its expected pre-programmed motion, the information provided in real-time from the additional sensors may be used to provide precise positional data to the light field rendering algorithm.

Following from the above-described embodiments, a further input variable includes the three-dimensional pupil location 1308.

The pupil location 1308, in one embodiment, is the three-dimensional coordinates of at least one the user's pupils' center with respect to a given reference frame, for example a point on the device or display. This pupil location 1308 may be derived from any eye/pupil tracking method known in the art. In some embodiments, the pupil location 1308 may be determined prior to any new iteration of the rendering algorithm, or in other cases, at a lower framerate. In some embodiments, only the pupil location of a single user's eye may be determined, for example the user's dominant eye (i.e. the one that is primarily relied upon by the user). In some embodiments, this position, and particularly the pupil distance to the screen may otherwise or additionally be rather approximated or adjusted based on other contextual or environmental parameters, such as an average or preset user distance to the screen (e.g. typical reading distance for a given user or group of users; stored, set or adjustable driver distance in a vehicular environment; etc.).

Figure 14A:
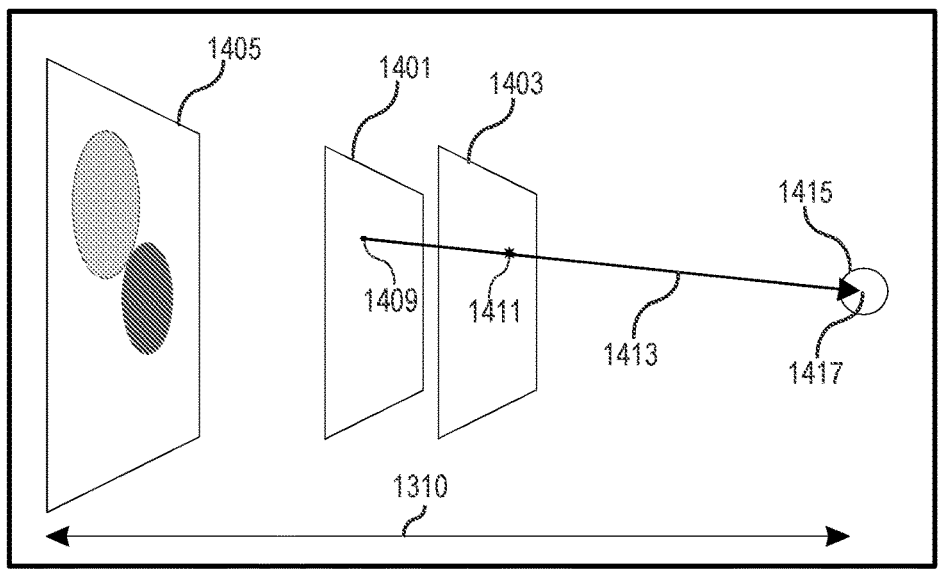
FIGS. 14A to 14C are schematic diagrams illustrating certain process steps of FIG. 12.
Figure 14B:
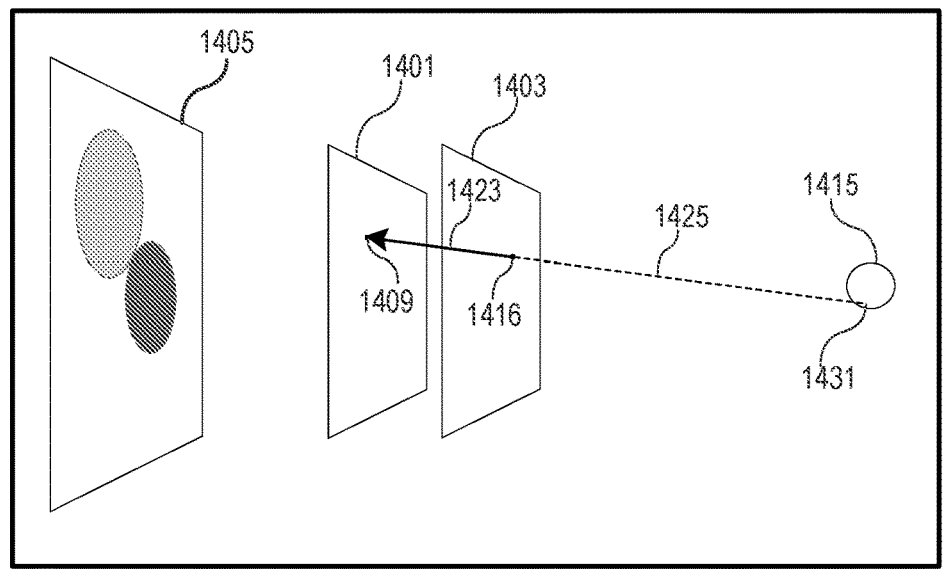
Figure 14C:
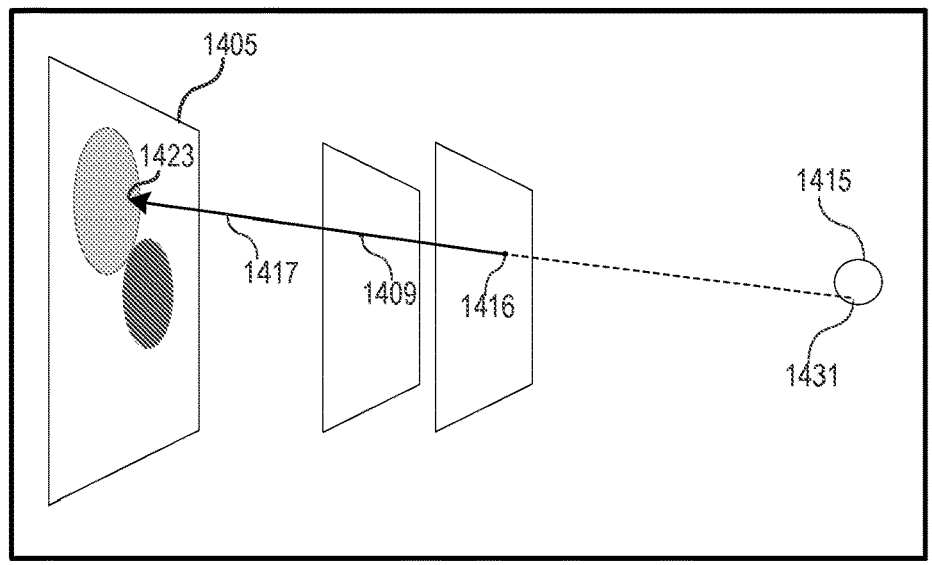
Figure 19:
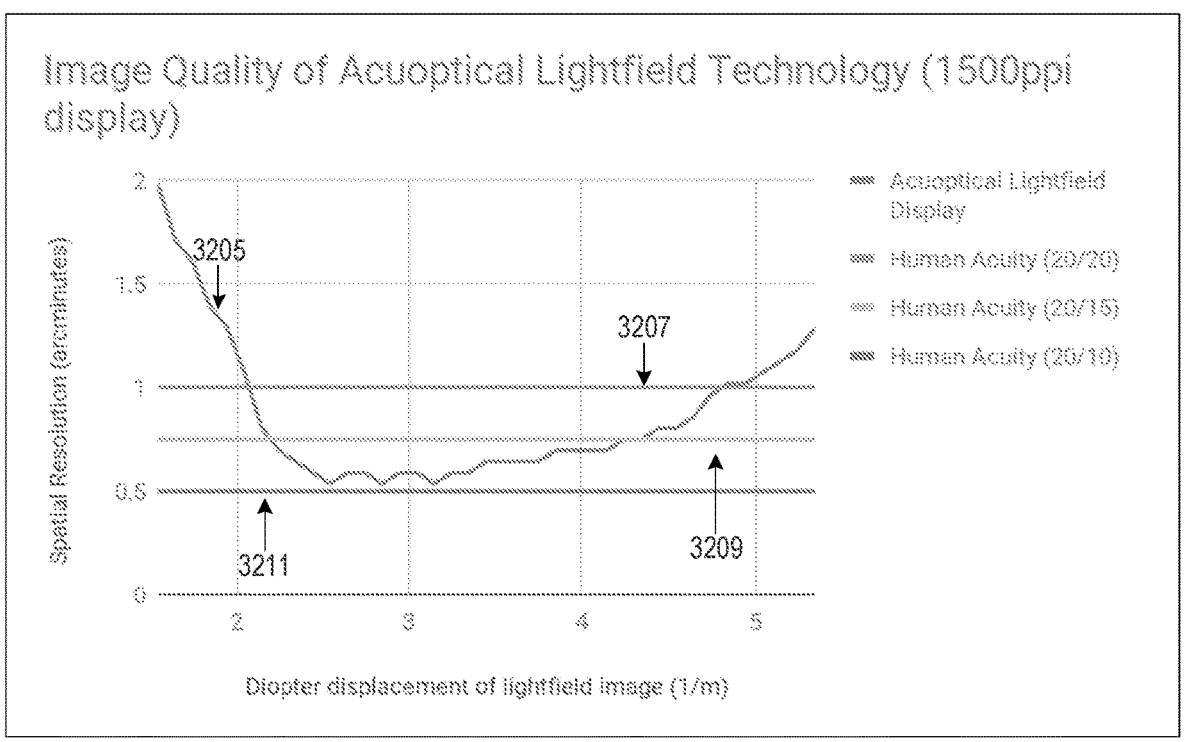
FIG. 19 is a plot of the angular resolution of an exemplary light field display as a function of the dioptric power generated, in accordance with one embodiment.

With added reference to FIGS. 14A to 14C, once constant parameters 1102, user parameters 1103 and variables 1104 have been set, the method of FIG. 12 then proceeds with step 1106, in which the minimum reading distance 1310 (and/or related parameters) is used to compute the position of a virtual (adjusted) image plane 1405 with respect to the device's display, followed by step 1108 wherein the size of image 1306 is scaled within the image plane 1405 to ensure that it correctly fills the pixel display 1401 when viewed by the distant user. This is illustrated in FIG. 19A, which shows a diagram of the relative positioning of the user's pupil 1415, the light field shaping layer 1403, the pixel display 1401 and the virtual image plane 1405. In this example, the size of image 1306 in image plane 1405 is increased to avoid having the image as perceived by the user appear smaller than the display's size.

An exemplary ray-tracing methodology is described in steps 1110 to 1128 of FIG. 12, at the end of which the output color of each pixel of pixel display 1401 is known so as to virtually reproduce the light field emanating from an image 1306 positioned at the virtual image plane 1405. In FIG. 12, these steps are illustrated in a loop over each pixel in pixel display 1401, so that each of steps 1110 to 1126 describes the computations done for each individual pixel. However, in some embodiments, these computations need not be executed sequentially, but rather, steps 1110 to 1128 may executed in parallel for each pixel or a subset of pixels at the same time. Indeed, as will be discussed below, this exemplary method is well suited to vectorization and implementation on highly parallel processing architectures such as GPUs.

As illustrated in FIG. 12A, in step 1110, for a given pixel 1409 in pixel display 1401, a trial vector 1413 is first generated from the pixel's position to the (actual or predicted) center position 1417 of pupil 1415. This is followed in step 1112 by calculating the intersection point 1411 of vector 1413 with the LFSL 1403.

The method then finds, in step 1114, the coordinates of the center 1416 of the LFSL optical element closest to intersection point 1411. Once the position of the center 1416 of the optical element is known, in step 1116, a normalized unit ray vector is generated from drawing and normalizing a vector 1423 drawn from center position 1416 to pixel 1409. This unit ray vector generally approximates the direction of the light field emanating from pixel 1409 through this particular light field element, for instance, when considering a parallax barrier aperture or lenslet array (i.e. where the path of light travelling through the center of a given lenslet is not deviated by this lenslet). Further computation may be required when addressing more complex light shaping elements, as will be appreciated by the skilled artisan. The direction of this ray vector will be used to find the portion of image 1306, and thus the associated color, represented by pixel 1409. But first, in step 1118, this ray vector is projected backwards to the plane of pupil 1415, and then in step 1120, the method verifies that the projected ray vector 1425 is still within pupil 1415 (i.e. that the user can still "see" it). Once the intersection position, for example location 1431 in FIG. 14B, of projected ray vector 1425 with the pupil plane is known, the distance between the pupil center 1417 and the intersection point 1431 may be calculated to determine if the deviation is acceptable, for example by using a pre-determined pupil size and verifying how far the projected ray vector is from the pupil center.

If this deviation is deemed to be too large (i.e. light emanating from pixel 1409 channeled through optical element 1416 is not perceived by pupil 1415), then in step 1122, the method flags pixel 1409 as unnecessary and to simply be turned off or render a black color. Otherwise, as shown in FIG. 14C, in step 1124, the ray vector is projected once more towards virtual image plane 1405 to find the position of the intersection point 1423 on image 1306. Then in step 1126, pixel 1409 is flagged as having the color value associated with the portion of image 1306 at intersection point 1423.

In some embodiments, method 1100 is modified so that at step 1120, instead of having a binary choice between the ray vector hitting the pupil or not, one or more smooth interpolation function (i.e. linear interpolation, Hermite interpolation or similar) are used to quantify how far or how close the intersection point 1431 is to the pupil center 1417 by outputting a corresponding continuous value between 1 or 0. For example, the assigned value is equal to 1 substantially close to pupil center 1417 and gradually change to 0 as the intersection point 1431 substantially approaches the pupil edges or beyond. In this case, the branch containing step 1122 is ignored and step 1220 continues to step 1124. At step 1126, the pixel color value assigned to pixel 1409 is chosen to be somewhere between the full color value of the portion of image 1306 at intersection point 1423 or black, depending on the value of the interpolation function used at step 1120 (1 or 0).

In yet other embodiments, pixels found to illuminate a designated area around the pupil may still be rendered, for example, to produce a buffer zone to accommodate small movements in pupil location, for example, or again, to address potential inaccuracies, misalignments or to create a better user experience.

In some embodiments, steps 1118, 1120 and 1122 may be avoided completely, the method instead going directly from step 1116 to step 1124. In such an exemplary embodiment, no check is made that the ray vector hits the pupil or not, but instead the method assumes that it always does.

Once the output colors of all pixels have been determined, these are finally rendered in step 1130 by pixel display 1401 to be viewed by the user, therefore presenting a light field corrected image. In the case of a single static image, the method may stop here. However, new input variables may be entered and the image may be refreshed at any desired frequency, for example because the user's pupil moves as a function of time and/or because instead of a single image a series of images are displayed at a given framerate.

With reference to FIGS. 15 and 16A to 16D, and in accordance with one embodiment, another exemplary computationally implemented ray-tracing method for rendering an adjusted image via the light field shaping layer (LFSL) that accommodates for the user's reduced visual acuity, for example, will now be described. Again, for illustrative purposes, in this example, adjustment of a single image (i.e. the image as whole) is being implemented without consideration for distinct image portions. Further examples below will specifically address modification of the following example for adaptively adjusting distinct image portions.

In this embodiment, the adjusted image portion associated with a given pixel/subpixel is computed (mapped) on the retina plane instead of the virtual image plane considered in the above example, again in order to provide the user with a designated image perception adjustment. Therefore, the currently discussed exemplary embodiment shares some steps with the method of FIG. 12. Indeed, a set of constant parameters 1102 may also be pre-determined. These may include, for example, any data that are generally based on the physical and functional characteristics of the display for which the method is to be implemented, as will be explained below. Similarly, user parameters 1103 comprising any data representative of the user's reduced visual acuity or condition and which are not expected to change significantly during a user's viewing session are also used. Finally, every iteration of the rendering algorithm may use a set of input variables 1404 which are expected to change either at each rendering iteration. The list of possible variables and constants is substantially the same as the one disclosed in FIG. 13 and will thus not be replicated here.

Once constant parameters 1102, user parameters 1103 and variables 1104 have been set, this second exemplary ray-tracing methodology proceeds from steps 1910 to 1936, at the end of which the output color of each pixel of the pixel display is known so as to virtually reproduce the light field emanating from an image perceived to be positioned at the correct or adjusted image distance, in one example, so to allow the user to properly focus on this adjusted image (i.e. having a focused image projected on the user's retina) despite a quantified visual aberration. In FIG. 15, these steps are illustrated in a loop over each pixel in pixel display 1401, so that each of steps 1910 to 1934 describes the computations done for each individual pixel. However, in some embodiments, these computations need not be executed sequentially, but rather, steps 1910 to 1934 may be executed in parallel for each pixel or a subset of pixels at the same time. Indeed, as will be discussed below, this second exemplary method is also well suited to vectorization and implementation on highly parallel processing architectures such as GPUs.

Referencing once more FIG. 14A, in step 1910 (as in step 1110), for a given pixel in pixel display 1401, a trial vector 1413 is first generated from the pixel's position to (actual or predicted) pupil center 1417 of the user's pupil 1415. This is followed in step 1912 by calculating the intersection point of vector 1413 with optical layer 1403.

From there, in step 1914, the coordinates of the optical element center 1416 closest to intersection point 1411 are determined. This step may be computationally intensive and will be discussed in more depth below. As shown in FIG. 14B, once the position of the optical element center 1416 is known, in step 1916, a normalized unit ray vector is generated from drawing and normalizing a vector 1423 drawn from optical element center 1416 to pixel 1409. This unit ray vector generally approximates the direction of the light field emanating from pixel 1409 through this particular light field element, for instance, when considering a parallax barrier aperture or lenslet array (i.e. where the path of light travelling through the center of a given lenslet is not deviated by this lenslet). Further computation may be required when addressing more complex light shaping elements, as will be appreciated by the skilled artisan. In step 1918, this ray vector is projected backwards to pupil 1415, and then in step 1920, the method ensures that the projected ray vector 1425 is still within pupil 1415 (i.e. that the user can still "see" it). Once the intersection position, for example location 1431 in FIG. 14B, of projected ray vector 1425 with the pupil plane is known, the distance between the pupil center 1417 and the intersection point 1431 may be calculated to determine if the deviation is acceptable, for example by using a pre-determined pupil size and verifying how far the projected ray vector is from the pupil center.

Now referring to FIGS. 16A to 16D, steps 1921 to 1929 of method 1900 will be described. Once optical element center 1416 of the relevant optical unit has been determined, at step 1921, a vector 2004 is drawn from optical element center 1416 to (actual or predicted) pupil center 1417. Then, in step 1923, vector 2004 is projected further behind the pupil plane onto eye focal plane 2006 (location where any light rays originating from optical layer 1403 would be focused by the eye) to locate focal point 2008. For a user with perfect vision, focal plane 2010 would be located at the same location as retina plane 2010, but in this example, focal plane 2006 is located behind retina plane 2006, which would be expected for a user with some form of farsightedness. The position of focal plane 2006 may be derived from the user's minimum reading distance 1310, for example, by deriving therefrom the focal length of the user's eye. Other manually input or computationally or dynamically adjustable means may also or alternatively be considered to quantify this parameter.

The skilled artisan will note that any light ray originating from optical element center 1416, no matter its orientation, will also be focused onto focal point 2008, to a first approximation. Therefore, the location on retina plane (2010) onto which light entering the pupil at intersection point 1431 will converge may be approximated by drawing a straight line between intersection point 1431 where ray vector 1425 hits the pupil 1415 and focal point 2008 on focal plane 2006. The intersection of this line with retina plane 2010 (retina image point 2012) is thus the location on the user's retina corresponding to the image portion that will be reproduced by corresponding pixel 1409 as perceived by the user. Therefore, by comparing the relative position of retina point 2012 with the overall position of the projected image on the retina plane 2010, the relevant adjusted image portion associated with pixel 1409 may be computed.

To do so, at step 1927, the corresponding projected image center position on retina plane 2010 is calculated. Vector 2016 is generated originating from the center position of display 1401 (display center position 2018) and passing through pupil center 1417. Vector 2016 is projected beyond the pupil plane onto retina plane 2010, wherein the associated intersection point gives the location of the corresponding retina image center 2020 on retina plane 2010. The skilled technician will understand that step 1927 could be performed at any moment prior to step 1929, once the relative pupil center location 1417 is known in input variables step 1904. Once image center 2020 is known, one can then find the corresponding image portion of the selected pixel/subpixel at step 1929 by calculating the x/y coordinates of retina image point 2012 relative to retina image center 2020 on the retina, scaled to the x/y retina image size 2031.

Figure 16A:
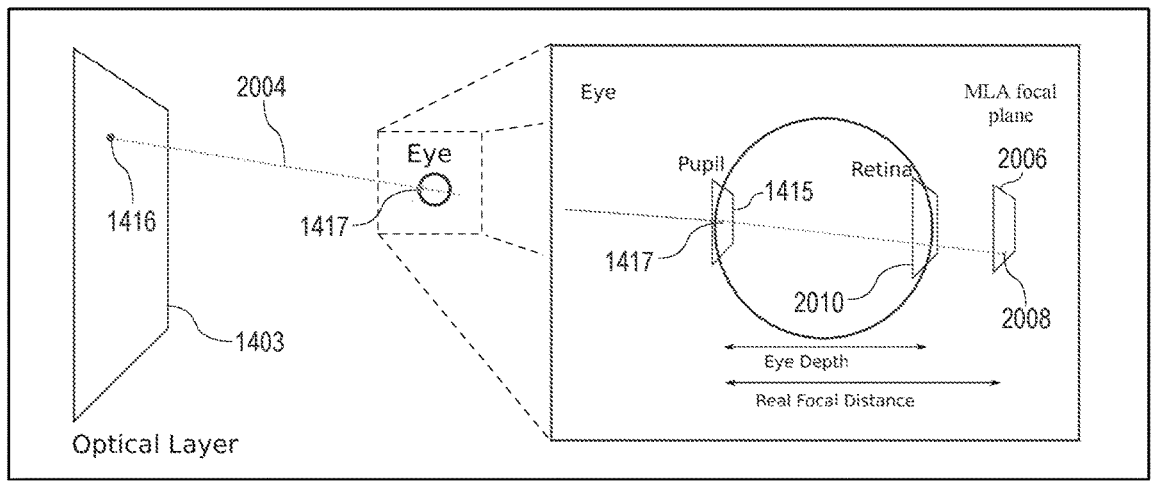
FIGS. 16A to 16D are schematic diagrams illustrating certain process steps of FIG. 15.
Figure 16B:
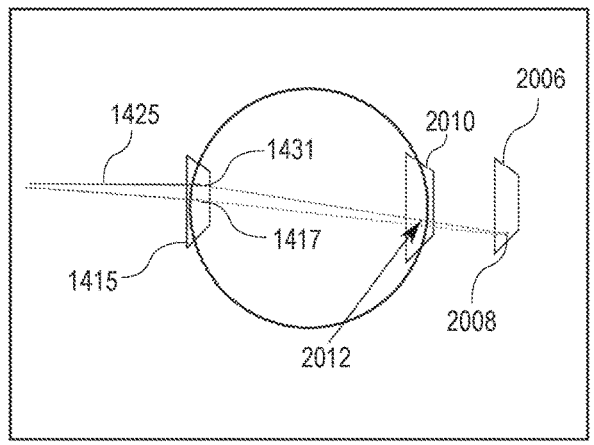
Figure 16C:
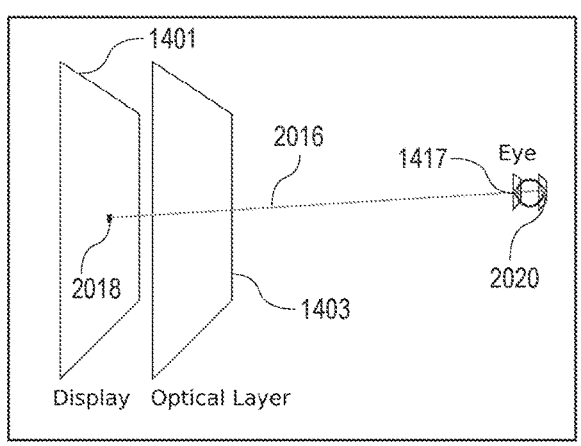
Figure 16D:
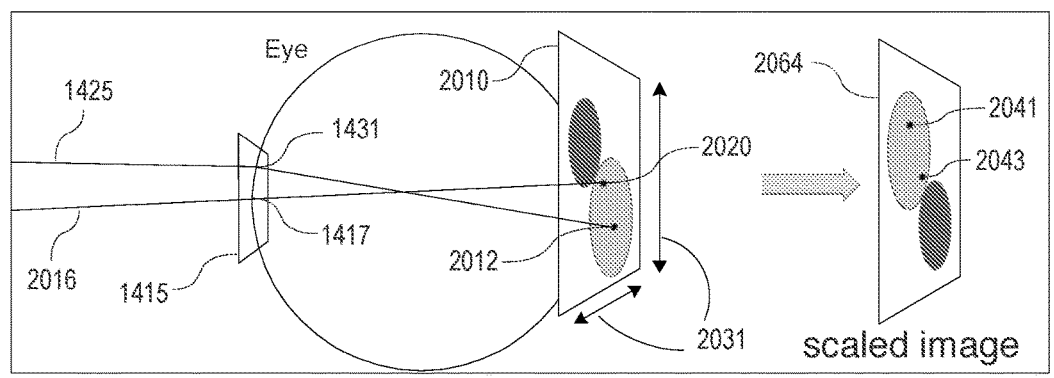

This retina image size 2031 may be computed by calculating the magnification of an individual pixel on retina plane 2010, for example, which may be approximately equal to the x or y dimension of an individual pixel multiplied by the eye depth 1314 and divided by the absolute value of the distance to the eye (i.e. the magnification of pixel image size from the eye lens). Similarly, for comparison purposes, the input image is also scaled by the image x/y dimensions to produce a corresponding scaled input image 2064. Both the scaled input image and scaled retina image should have a width and height between −0.5 to 0.5 units, enabling a direct comparison between a point on the scaled retina image 2010 and the corresponding scaled input image 2064, as shown in FIG. 16D.

From there, the image portion position 2041 relative to retina image center position 2043 in the scaled coordinates (scaled input image 2064) corresponds to the inverse (because the image on the retina is inverted) scaled coordinates of retina image point 2012 with respect to retina image center 2020. The associated color with image portion position 2041 is therefrom extracted and associated with pixel 1409.

In some embodiments, method 1900 may be modified so that at step 1920, instead of having a binary choice between the ray vector hitting the pupil or not, one or more smooth interpolation function (i.e. linear interpolation, Hermite interpolation or similar) are used to quantify how far or how close the intersection point 1431 is to the pupil center 1417 by outputting a corresponding continuous value between 1 or 0. For example, the assigned value is equal to 1 substantially close to pupil center 1417 and gradually change to 0 as the intersection point 1431 substantially approaches the pupil edges or beyond. In this case, the branch containing step 1122 is ignored and step 1920 continues to step 1124. At step 1931, the pixel color value assigned to pixel 1409 is chosen to be somewhere between the full color value of the portion of image 1306 at intersection point 1423 or black, depending on the value of the interpolation function used at step 1920 (1 or 0).

In yet other embodiments, pixels found to illuminate a designated area around the pupil may still be rendered, for example, to produce a buffer zone to accommodate small movements in pupil location, for example, or again, to address potential inaccuracies or misalignments.

Once the output colors of all pixels in the display have been determined (check at step 1934 is true), these are finally rendered in step 1936 by pixel display 1401 to be viewed by the user, therefore presenting a light field corrected image. In the case of a single static image, the method may stop here. However, new input variables may be entered and the image may be refreshed at any desired frequency, for example because the user's pupil moves as a function of time and/or because instead of a single image a series of images are displayed at a given framerate.

As will be appreciated by the skilled artisan, selection of the adjusted image plane onto which to map the input image in order to adjust a user perception of this input image allows for different ray tracing approaches to solving a similar challenge, that is of creating an adjusted image using the light field display that can provide an adjusted user perception, such as addressing a user's reduce visual acuity. While mapping the input image to a virtual image plane set at a designated minimum (or maximum) comfortable viewing distance can provide one solution, the alternate solution may allow accommodation of different or possibly more extreme visual aberrations. For example, where a virtual image is ideally pushed to infinity (or effectively so), computation of an infinite distance becomes problematic. However, by designating the adjusted image plane as the retinal plane, the illustrative process of FIG. 15 can accommodate the formation of a virtual image effectively set at infinity without invoking such computational challenges. Likewise, while first order focal length aberrations are illustratively described with reference to FIG. 15, higher order or other optical anomalies may be considered within the present context, whereby a desired retinal image is mapped out and traced while accounting for the user's optical aberration(s) so to compute adjusted pixel data to be rendered in producing that image. These and other such considerations should be readily apparent to the skilled artisan.

While the computations involved in the above described ray-tracing algorithms (steps 1110 to 1128 of FIG. 12 or steps 1920 to 1934 of FIG. 15) may be done on general CPUs, it may be advantageous to use highly parallel programming schemes to speed up such computations. While in some embodiments, standard parallel programming libraries such as Message Passing Interface (MPI) or OPENMP may be used to accelerate the light field rendering via a general-purpose CPU, the light field computations described above are especially tailored to take advantage of graphical processing units (GPU), which are specifically tailored for massively parallel computations. Indeed, modern GPU chips are characterized by the very large number of processing cores, and an instruction set that is commonly optimized for graphics. In typical use, each core is dedicated to a small neighborhood of pixel values within an image, e.g., to perform processing that applies a visual effect, such as shading, fog, affine transformation, etc. GPUs are usually also optimized to accelerate exchange of image data between such processing cores and associated memory, such as RGB frame buffers. Furthermore, smartphones are increasingly being equipped with powerful GPUs to speed the rendering of complex screen displays, e.g., for gaming, video, and other image-intensive applications. Several programming frameworks and languages tailored for programming on GPUs include, but are not limited to, CUDA, OpenCL, OpenGL Shader Language (GLSL), High-Level Shader Language (HLSL) or similar. However, using GPUs efficiently may be challenging and thus require creative steps to leverage their capabilities, as will be discussed below.

With reference to FIGS. 17, 18A to 18C, and 19A and B, and in accordance with different embodiments, an exemplary subjective vision testing system, generally referred to using the numeral 3000, will now be described. At the heart of this system is a light field vision testing device such as a light field refractor or phoropter 3001. Generally, the light field phoropter 3001 is a device comprising, at least in part, a light field display 3003 and which is operable to display or generate one or more optotypes to a patient having his/her vision acuity (e.g. refractive error) tested. In some embodiments, the light field phoropter may comprise an eye tracker 3009 (such as a near-IR camera or other as discussed above) that may be used to determine the pupil center position in real-time or near real-time, for accurately locating the patient's pupil, as explained above with regard to the ray-tracing methods 1100, 1900, 2400, or 2700. Indeed, FIG. 19 shows a plot of the angular resolution (in arcminutes) of an exemplary light field display comprising a 1500 ppi digital pixel display as a function of the dioptric power of the light field image (in diopters). We clearly see that, in this particular example, the light field display is able to generate displacements in diopters that have higher resolution corresponding to 20/20 vision or better (e.g. 20/15) and close to (20/10)), here within a dioptric power range of 2 to 2.5 diopters. Thus, the light field displays and ray-tracing methods described above, according to different embodiments, may be used to replace, at least in part, traditional optical components. In some embodiments, a head-rest, eyepiece or similar (not shown) may be used to keep the patient's head still and in the same location, thus in such examples, foregoing the general utility of a pupil tracker or similar techniques by substantially fixing a pupil location relative to this headrest. In some embodiments, phoropter 3001 may comprise a network interface 3023 for communicating via network to a remote database or server 3059.

Figure 18A:
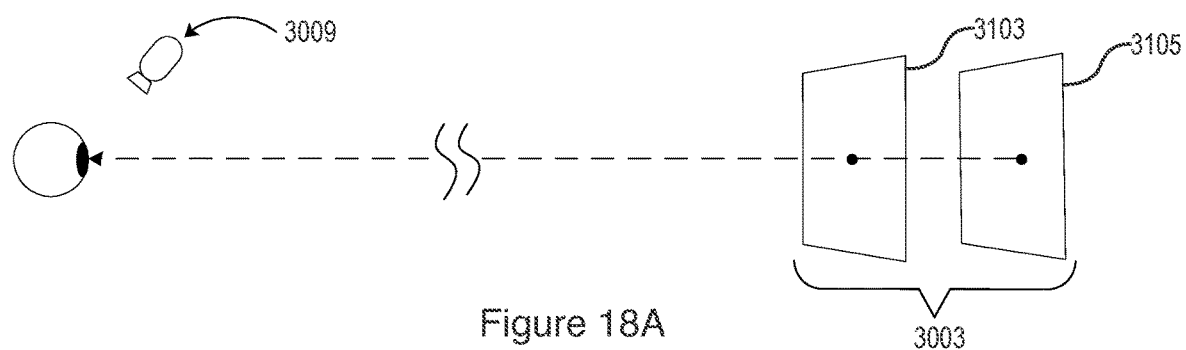
FIGS. 18A to 18C are schematic diagrams of exemplary light field refractors/phoropter, in accordance with different embodiments.

For example, in one embodiment and as illustrated in FIG. 18A, the light field phoropter 3001 may comprise light field display 3003 (herein comprising a MLA 3103, such as a vibrating MLA as described above, and a digital pixel display 3105) located relatively far away (e.g. one or more meters) from the patient's eye 3101 currently being diagnosed. Note that the pointed line is used to schematically illustrate the direction of the light rays emitted by the display 3105. Also illustrated is the eye-tracker 3009, which may be provided as a physically separate element, for example, installed in at a given location in a room or similar. In some embodiments, the noted eye/pupil tracker may include the projection of IR markers/patterns to help align the patient's eye with the light field display. In some embodiments, a tolerance window (e.g. "eye box") may be considered to limit the need to refresh the ray-tracing iteration. An exemplary value of the size of the eye box, in some embodiments, is around 6 mm, though smaller (e.g. 4 mm) or larger eye boxes may alternatively be set to impact image quality, stability or like operational parameters.

Going back to FIG. 17, light field phoropter 3001 may also comprise, according to different embodiments and as will be further discussed below, one or more refractive optical components 3007, a processing unit 3021, a data storage unit or internal memory 3013, a network interface 3023, one or more cameras 3017 and a power module 3023.

In some embodiments, power module 3023 may comprise, for example, a rechargeable Li-ion battery or similar. In some embodiments, it may comprise an additional external power source, such as, for example, a USB-C external power supply. It may also comprise a visual indicator (screen or display) for communicating the device's power status, for example whether the device is on/off or recharging.

In some embodiments, internal memory 3013 may be any form of electronic storage, including a disk drive, optical drive, read-only memory, random-access memory, or flash memory, to name a few examples. In some embodiments, a library of chart patterns (Snellen charts, prescribed optotypes, forms, patterns, or other) may be located in internal memory 3013 and/or retrievable from remote server 3059.

Figure 20A:
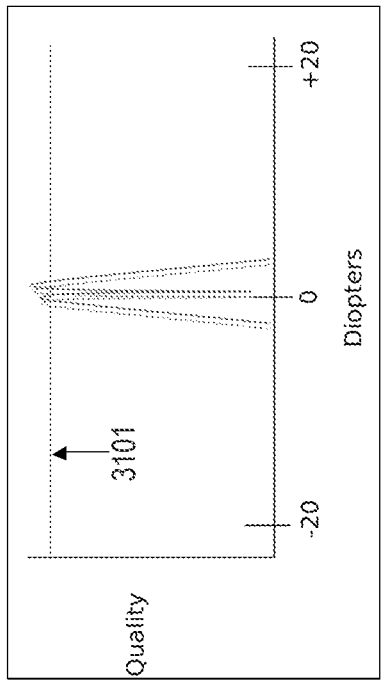
FIGS. 20A to 20D are schematic plots of the image quality generated by a light field refractor/phoropter as a function of the dioptric power generated by using in combination with the light field display (A) no refractive component, (B) one refractive component, (C) and (D) a multiplicity of refractive components.
Figure 20B:
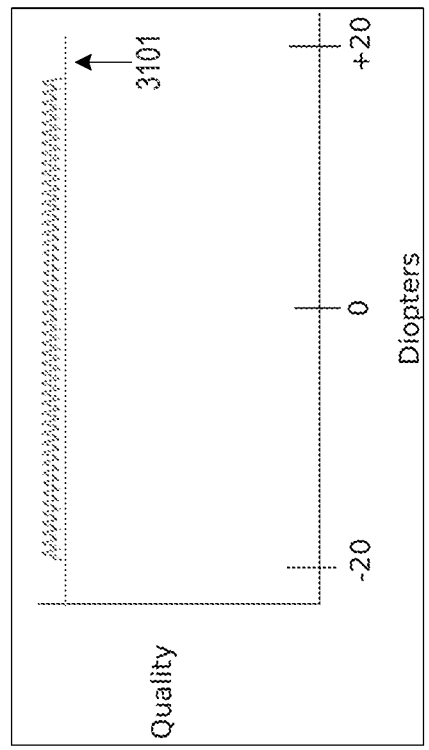

In some embodiments, one or more optical components 3007 can be used in combination with the light field display 3003, for example to shorten the device's dimensions and still offer an acceptable range in dioptric power. The general principle is schematically illustrated in the plots of FIGS. 20A to 20D. In these plots, the image quality (e.g. inverse of the angular resolution, higher is better) at which optotypes are small enough to be useful for vision testing in this plot is above horizontal line 3101 which represents typical 20/20 vision. FIG. 18A shows the plot for the light field display only, where we see the characteristic two peaks corresponding to the smallest resolvable point, one of which was plotted in FIG. 19 (here inverted and shown as a peak instead of a basin), and where each region above the line may cover a few diopters of dioptric power, according to some embodiments. While the dioptric range may, in some embodiments, be more limited than needed when relying only on the light field display, it is possible to shift this interval by adding one or more refractive optical components. This is shown in FIG. 20B where the regions above the line 3301 is shifted to the left (negative diopters) by adding a single lens in the optical path.

Figure 20C:
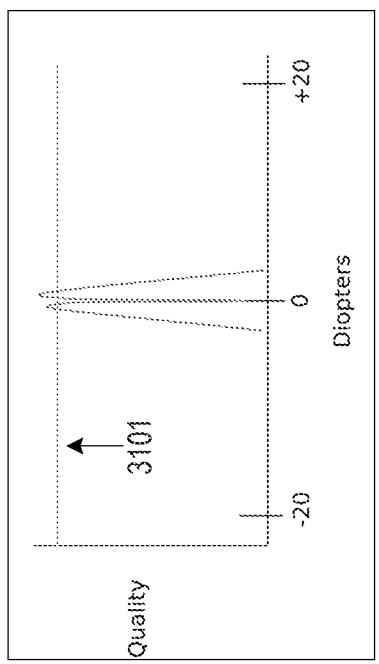
Figure 20D:
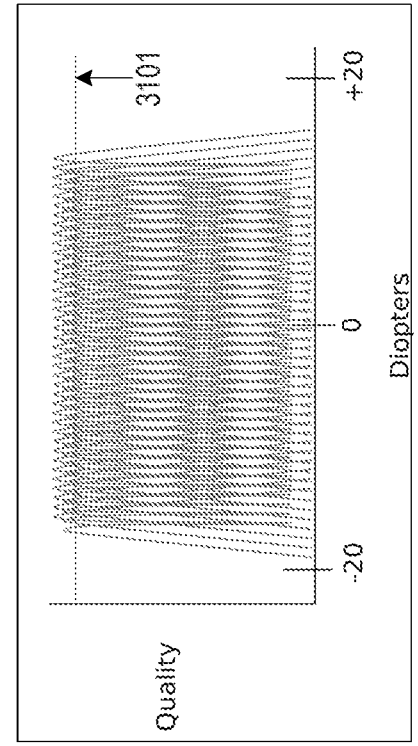

Thus, by using a multiplicity of refractive optical components or by alternating sequentially between different refractive components of increasing or decreasing dioptric power, it is possible to shift the center of the light field diopter range to any required value, as shown in FIG. 20C, and thus the image quality may be kept above line 3101 for any required dioptric power as shown in FIG. 20D. In some embodiments, a range of 30 diopters from +10 to −20 may be covered for example. In the case of one or more reels of lenses, the lens may be switched for a given larger dioptric power increment, and the light field display would be used to provide a finer continuous change to accurately pin-point the required total dioptric power required to compensate for the patient's reduced visual acuity. This would still result in light field phoropter 3001 having a reduced number of refractive optical components compared to the number of components needed in a traditional phoropter, while drastically enhancing the overall fine-tuning ability of the device.

One example, according to one embodiment, of such a light field phoropter 3001 is schematically illustrated in FIG.

18B, wherein the light field display 3003 (herein shown again comprising MLA 3103 and digital pixel display 3105) is combined with a multiplicity of refractive components 3007 (herein illustrate as a reel of lenses as an example only). By changing the refractive component used in combination with the light field display, a larger dioptric range may be covered. This may also provide means to reduce the device's dimension, making it in some embodiments more portable, and encompass all its internal components into a shell, housing or casing 3111. In some embodiments, the light field phoropter may comprise a durable ABS housing and may be shock and harsh-environment resistant. In some embodiments, the light field phoropter 3001 may comprise a telescopic feel for fixed or portable usage; optional mounting brackets, and/or a carrying case. In some embodiments, all components may be internally protected and sealed from the elements.

In some embodiments, the casing may further comprise an eye piece or similar that the patient has to look through, which may limit movement of the patient's eye 3101 during diagnostic and/or indirectly provide a pupil location to the light field renderer.

In some embodiments, it may also be possible to further reduce the size of the device by adding, for example, a mirror or any device which may increase the optical path. This is illustrated in FIG. 18C where the length of the device was reduced by adding a mirror 3141. This is shown schematically by the pointed arrow which illustrates the light being emitted from pixel display 3105 travelling through MLA 3103 before being reflected by mirror 3141 back through refractive components 3007 and ultimately hitting the eye 3101.

The skilled technician will understand that different examples of refractive components 3007 may include, without limitation, one or more lenses, sometimes arranged in order of increasing dioptric power in one or more reels of lenses similar to what is typically found in traditional phoropters; an electrically controlled fluid lens; active Fresnel lens; and/or Spatial Light Modulators (SLM). In some embodiments, additional motors and/or actuators may be used to operate refractive components 3007. These may be communicatively linked to processing unit 3021 and power module 3023, and operate seamlessly with light display 3003 to provide the required dioptric power.

Figure 18B:
Figure 18C:
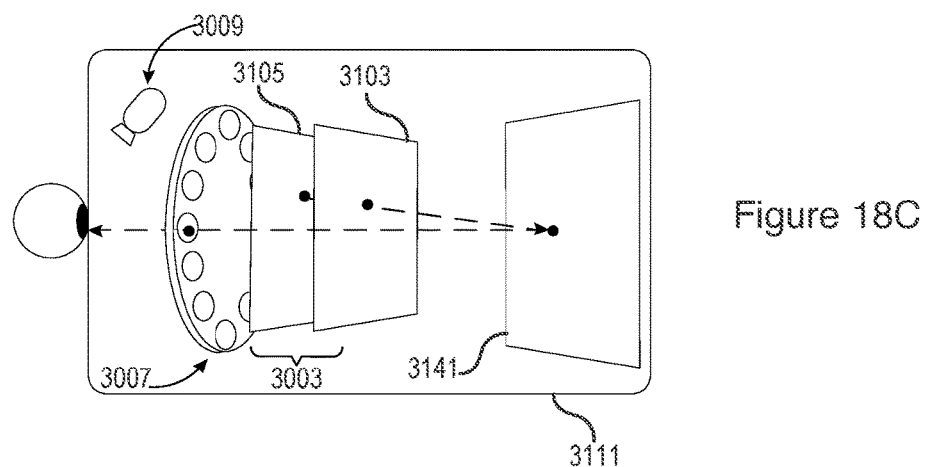
Figure 21A:
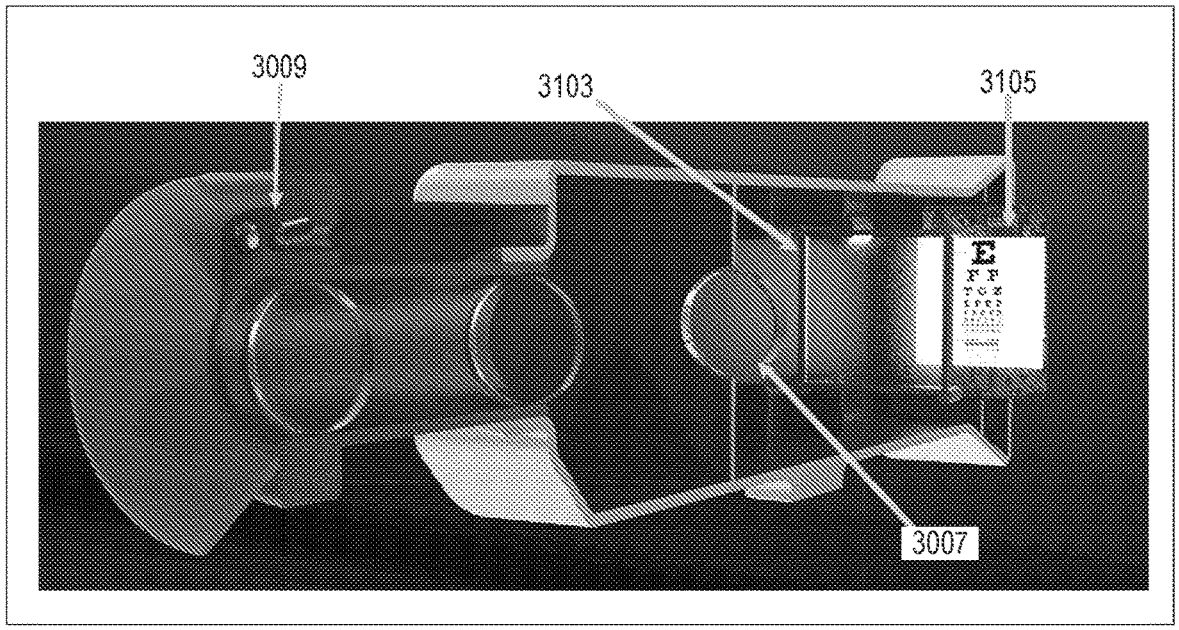
FIGS. 21A and 21B are perspective internal views of exemplary light field refractors/phoropters showing a casing thereof in cross-section, in accordance with one embodiment.
Figure 21B:
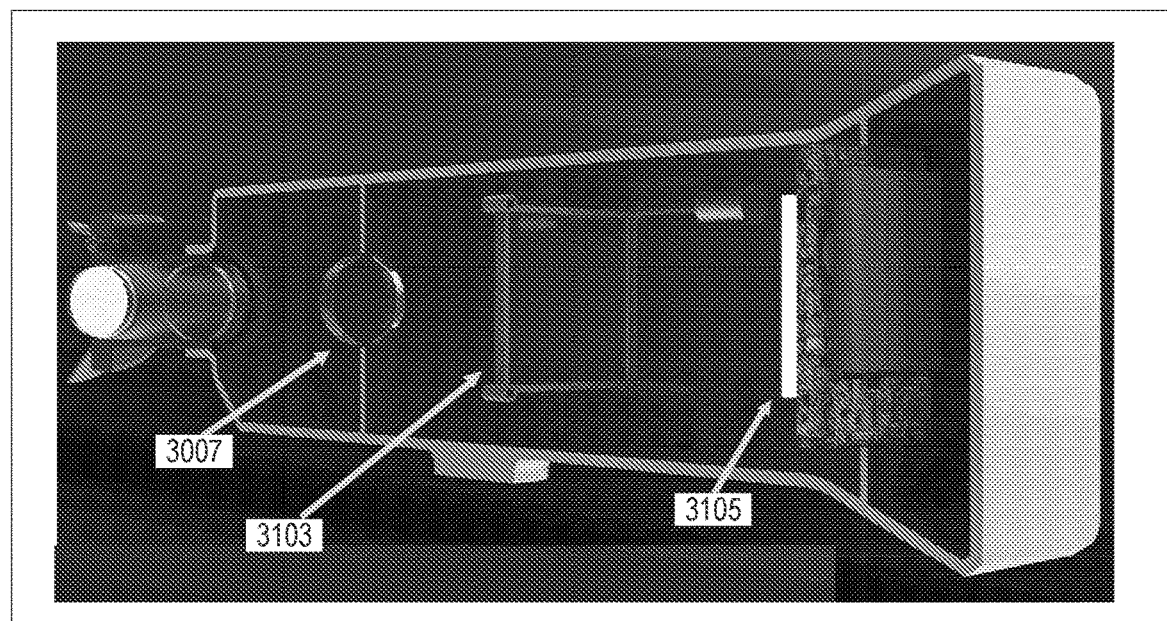

For example, FIGS. 21A and 21B show a perspective view of an exemplary light field phoropter 3001 similar to the one of FIG. 18B, but wherein the refractive component 3007 is an electrically tunable liquid lens. Thus, in this particular embodiment, no mechanical or moving component are used, which may result in the device being more robust. In some embodiments, the electrically tunable lens may have a range of ±13 diopters.

In one illustrative embodiment, a 1000 dpi display is used with a MLA having a 65 mm focal distance and 1000 µm pitch with the user's eye located at a distance of about 26 cm. A similar embodiment uses the same MLA and user distance with a 3000 dpi display.

Other displays having resolutions including 750 dpi, 1000 dpi, 1500 dpi and 3000 dpi were also tested or used, as were MLAs with a focal distance and pitch of 65 mm and 1000 µm, 43 mm and 525 µm, 65 mm and 590 µm, 60 mm and 425 µm, 30 mm and 220 µm, and 60 mm and 425 µm, respectively, and user distances of 26 cm, 45 cm or 65 cm.

Different MLA and display parameters and configurations can be considered depending on the application at hand, device form factor, and intended results as to resolution, brightness, etc. Naturally, in providing a vision testing device, high resolution and accurate/smooth dynamic control and adjustment of the user's visual perception of rendered images/optotypes is preferred. As described above, while implementation of lightfield display using a MLA, parallax barrier or like light field shaping layer can result in some drop in resolution/brightness given that a reduced number of pixels may ultimately be used to render a particular image/optotype, vibrating/oscillating the LFSL relative to the pixels, as described above, can result in improved optical rendering and image perception quality. Indeed, in one embodiment, the LFSL of the light-field refractor is actuated to vibrate/oscillate during operation, thus benefiting from the improvements noted above with reference to FIGS. 10A-11B.

As noted above, in some embodiments, a digital display may have from 1000 ppi, 1500 ppi, 3000 ppi or more, whereby higher ppi values may enable smaller incremental dioptric corrections to be implemented using the eye testing device (e.g. 0.25 diopter or lower increments). In some embodiments, a refresh rate of the display may be of the order of 90 Hz, though lower refresh rates, such as for example, 30 Hz, can be used, particularly when dealing with static images in an eye testing application.

In one embodiment, as introduced above, an MLA is shifted by 90 degrees in micrometer precision to match the refresh rate of the screen, so taking the MLA through a 360-degree displacement in four distinct locations, each allowing for a persistence of vision effect causing a sub-pixel result. In some embodiments, for every MLA position, light tracing and rendering may be recomputed to improve image perception accuracy and consistency. For example, in some embodiments, ray tracing computations may be implemented at a frequency of up to 100 Hz, thus allowing for recalculation at each MLA position.

Figure 17:
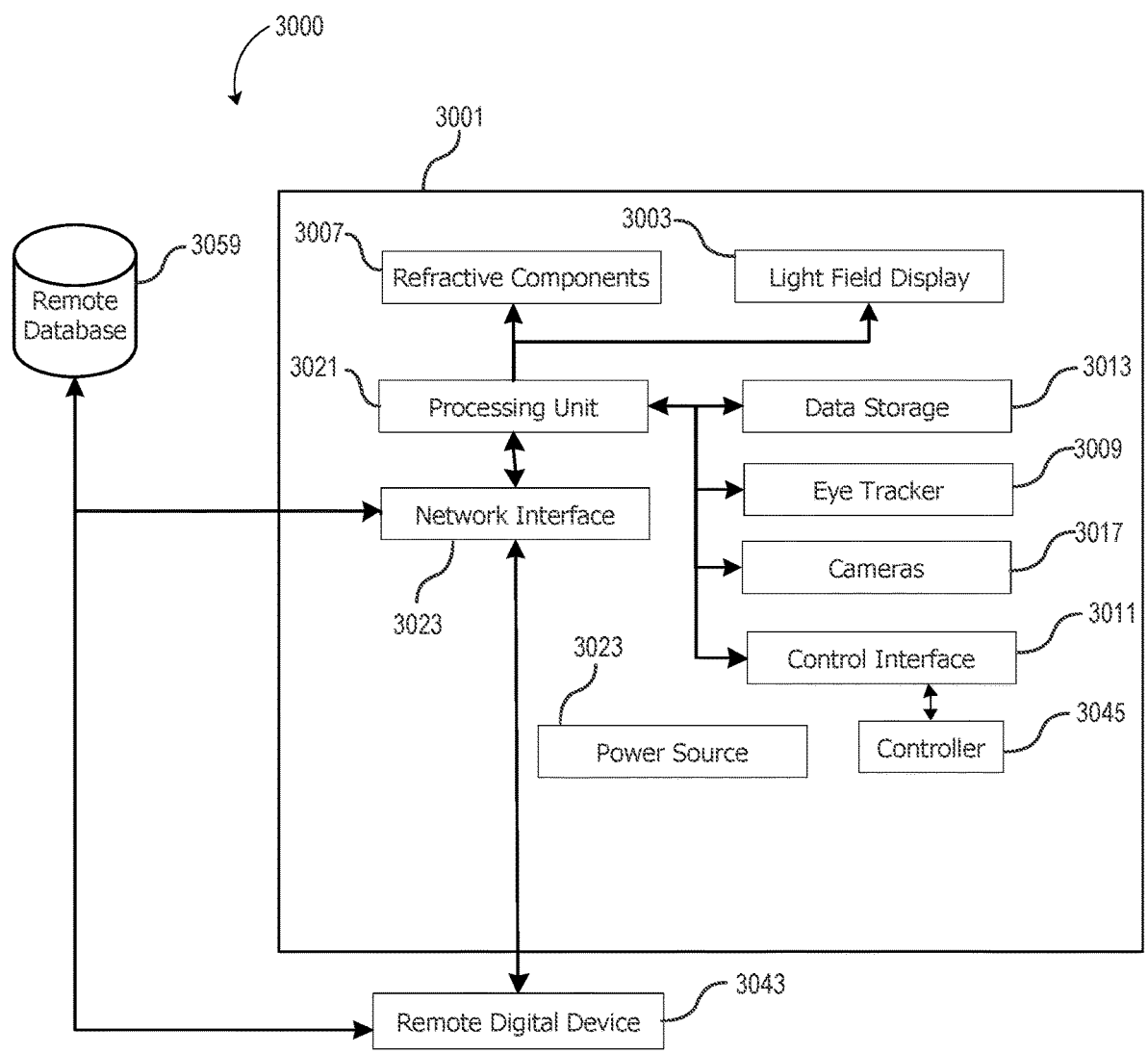
FIG. 17 is a schematic diagram of an exemplary vision testing system, in accordance with one embodiment.

Going back to FIG. 17, in some embodiments, eye-tracker 3009 may be a digital camera, in which case it may be used to further acquire images of the patient's eye to provide further diagnostics, such as pupillary reflexes and responses during testing for example. In other embodiments, one or more additional cameras 3017 may be used to acquire these images instead. In some embodiments, light field phoropter 3001 may comprise built-in stereoscopic tracking cameras.

In some embodiments, feedback and/or control of the vision test being administered may be given via a control interface 3011. In some embodiments, the control interface 3011 may comprise a dedicated handheld controller-like device 3045. This controller 3045 may be connected via a cable or wirelessly, and may be used by the patient directly and/or by an operator like an eye professional. In some embodiments, both the patient and operator may have their own dedicated controller. In some embodiments, the controller may comprise digital buttons, analog thumbstick, dials, touch screens, and/or triggers.

In some embodiments, control interface 3011 may comprise a digital screen or touch screen, either on the phoropter device itself or on an external module. In other embodiments, the control interface may let other remote devices control the light field phoropter via the network interface. For example, remote digital device 3043 may be connected to light field phoropter by a cable (e.g. USB cable, etc.) or wirelessly (e.g. via Bluetooth or similar) and interface with the light field phoropter via a dedicated application, software or website. Such a dedicated application may comprise a graphical user interface (GUI), and may also be communicatively linked to remote database 3059.

In some embodiments, the patient may give feedback verbally and the operator may control the vision test as a function of that verbal feedback. In some embodiments, phoropter 3001 may comprise a microphone to record the patient's verbal communications, either to communicate them to a remote operator via network interface 3023 or to directly interact with the device (e.g. via speech recognition or similar).

In some embodiments, processing unit 3021 may be communicatively connected to data storage 3013, eye tracker 3009, light field display 3003 and refractive components 3007. Processing unit 3021 may be responsible for rendering one or more optotypes via light field display 3003 and, in some embodiments, jointly control refractive components 3007 to achieve a required total dioptric power. It may also be operable to send and receive data to internal memory 3013 or to/from remote database 3059.

In some embodiments, diagnostic data may be automatically transmitted/communicated to remote database 3059 or remote digital device 3043 via network interface 3023 through the use of a wired or wireless network connection. The skilled artisan will understand that different means of connecting electronic devices may be considered herein, such as, but not limited to, Wi-Fi, Bluetooth, NFC, Cellular, 2G, 3G, 4G, 5G or similar. In some embodiments, the connection may be made via a connector cable (e.g. USB including microUSB, USB-C, Lightning connector, etc.). In some embodiments, remote digital device 3043 may be located in a different room, building or city.

Figure 22:
FIG. 22 is a perspective view of an exemplary light field refractor/phoropter combining side-by-side two of the units shown in FIGS. 21A and 21B for evaluating both eyes at the same time, in accordance with one embodiment.

In some embodiments, two light field phoropters 3001 may be combined side-by-side to independently measure the visual acuity of both left and right eye at the same time. An example is shown in FIG. 22, where two units corresponding to the embodiment of FIGS. 21A and 21B (used as an example only) are placed side-by-side or fused into a single device.

In some embodiments, a dedicated application, software or website may provide integration with third party patient data software. In some embodiments, the phoropter's software may be updated on-the-fly via a network connection and/or be integrated with the patient's smartphone app for updates and reminders.

In some embodiments, the dedicated application, software or website may further provide a remote, real-time collaboration platform between the eye professional and patient, and/or between different eye professionals. This may include interaction between different participants via video chat, audio chat, text messages, etc.

In some embodiments, light field phoropter 3001 may be self-operated or operated by an optometrist, ophthalmologist or other certified eye-care professional. For example, in some embodiments, a patient could use phoropter 3001 in the comfort of his/her own home.

Figure 23:
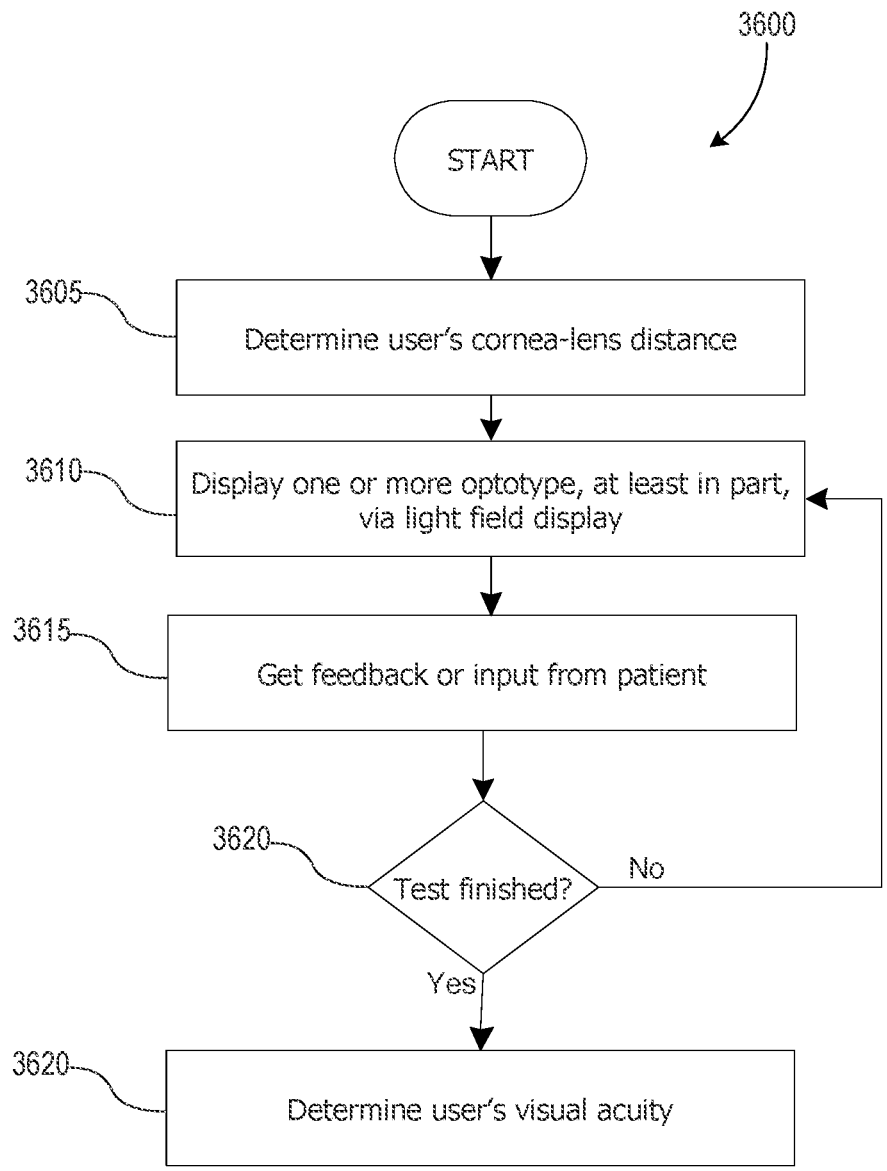
FIG. 23 is a process flow diagram of an exemplary dynamic subjective vision testing method, in accordance with one embodiment.

With reference to FIG. 23 and in accordance with different exemplary embodiments, a dynamic subjective vision testing method using vision testing system 3000, generally referred to using the numeral 3600, will now be described. As mentioned above, the use of a light field display enables phoropter 3001 of vision testing system 3000 to provide more dynamic and/or more modular vision tests than what is generally possible with traditional phoropters. Generally, method 3600 seeks to diagnose a patient's reduced visual acuity and produce therefrom, in some embodiments, an eye prescription or similar.

In some embodiments, eye prescription information may include, for each eye, one or more of: distant spherical, cylindrical and/or axis values, and/or a near (spherical) addition value.

In some embodiments, the eye prescription information may also include the date of the eye exam and the name of the eye professional that performed the eye exam. In some embodiments, the eye prescription information may also comprise a set of vision correction parameter(s) 201 used to operate any vision correction light field displays using the systems and methods described above. In some embodiments, the eye prescription may be tied to a patient profile or similar, which may contain additional patient information such as a name, address or similar. The patient profile may also contain additional medical information about the user. All information or data (i.e. set of vision correction parameter(s) 201, user profile data, etc.) may be kept on remote database 3059. Similarly, in some embodiments, the user's current vision correction parameter(s) may be actively stored and accessed from external database 3059 operated within the context of a server-based vision correction subscription system or the like, and/or unlocked for local access via the client application post user authentication with the server-based system.

Phoropter 3001 being, in some embodiments, portable, a large range of environment may be chosen to deliver the vision test (home, eye practitioner's office, etc.). At the start, the patient's eye may be placed at the required location. This is usually by placing his/her head on a headrest or by placing the objective (eyepiece) on the eye to be diagnosed. As mentioned above, the vision test may be self-administered or partially self-administered by the patient. For example, the operator (e.g. eye professional or other) may have control over the type of test being delivered, and/or be the person who generates or helps generate therefrom an eye prescription, while the patient may enter inputs dynamically during the test (e.g. by choosing or selecting an optotype, etc.).

As discussed above, the light field rendering method 3600 generally requires an accurate location of the patient's pupil center. Thus, at step 3605, such a location is acquired. In some embodiments, such a pupil location may be acquired via eye tracker 3009, either once, at intervals, or continuously. In other embodiments, the location may be derived from the device or system's dimension. For example, in some embodiments, the use an eye-piece or similar provides an indirect means of deriving the pupil location. In some embodiments, the phoropter 3001 may be self-calibrating and not require any additional external configuration or manipulation from the patient or the practitioner before being operable to start a vision test.

At step 3610, one or more optotypes is/are displayed to the patient, at one or more dioptric power (e.g. in sequence, side-by-side, or in a grid pattern/layout). The use of light field display 3003 offers multiple possibilities regarding how the optotypes are presented, and at which dioptric power each may be rendered. The optotypes may be presented sequentially at different dioptric power, via one or more dioptric power increments. In some embodiments, the patient and/or operator may control the speed and size of the dioptric power increments.

Figure 24:
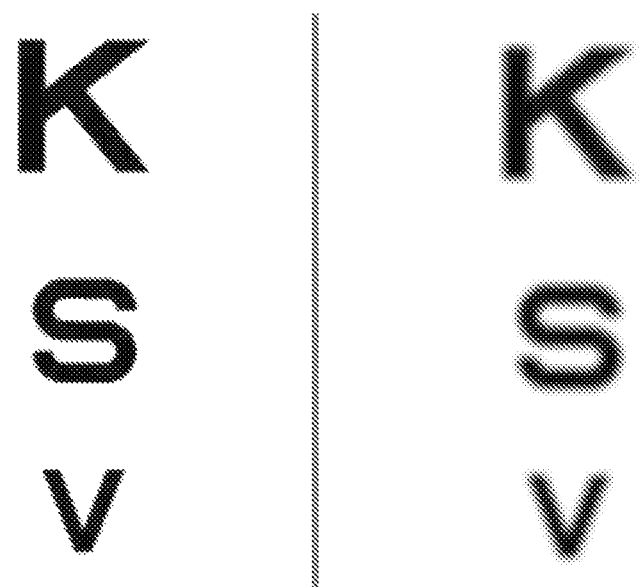
FIG. 24 is an schematic diagram of an exemplary light field image showing two columns of optotypes at different dioptric power for the method of FIG. 23, in accordance with one embodiment.

In some embodiments, optotypes may also be presented, at least in part, simultaneously on the same image but rendered at a different dioptric power. For example, FIG. 24 shows an example of how different optotypes may be displayed to the patient but rendered with different dioptric power simultaneously. These may be arranged in columns or in a table or similar. In FIG. 24, we see two columns of three optotypes (K, S, V), varying in size, as they are perceived by a patient, each column being rendered at different degrees of refractive correction (e.g. dioptric power). In this specific example, the optotypes on the right are being perceived as blurrier than the optotypes on the left. Methods for implementing different perception adjustments are described, for example, in co-pending U.S. patent application Ser. No. 16/810,143.

Thus, at step 3620, the patient would communicate/verbalize this information to the operator or input/select via control interface 3011 the left column as the one being clearer. Thus, in some embodiments, method 3600 may be configured to implement dynamic testing functions that dynamically adjust one or more displayed optotype's dioptric power in real-time in response to a designated input, herein shown by the arrow going back to step 3610. In the case of sequentially presented optotypes, the patient may indicate when the optotypes shown are clearer. In some embodiments, the patient may control the sequence of optotypes shown (going back and forth as needed in dioptric power), and the speed and increment at which these are presented, until he/she identifies the clearest optotype. In some embodiments, the patient may indicate which optotype or which group of optotypes is the clearest by moving an indicator icon or similar within the displayed image.

In some embodiments, the optotypes may be presented via a video feed or similar.

In some embodiments, when using a reel of lenses or similar, discontinuous changes in dioptric power may be unavoidable. For example, the reel of lenses may be used to provide a larger increment in dioptric power, as discussed above. Thus, step 3610 may in this case comprise first displaying larger increments of dioptric power by changing lens as needed, and when the clearest or less blurry optotypes are identified, fine-tuning with continuous or smaller increments in dioptric power using the light field display. In the case of optotypes presented simultaneously, the refractive components 3007 may act on all optotypes at the same time, and the change in dioptric power between them may be controlled only by the light display 3003. In some embodiments, for example when using an electrically tunable fluid lens or similar, the change in dioptric power may be continuous.

In some embodiments, eye images may be recorded during steps 3610 to 3620 and analyzed to provide further diagnostics. For example, eye images may be compared to a bank or database of proprietary eye exam images and analyzed, for example via an artificial intelligence (AI) or Machine-learning (ML) system or similar. This analysis may be done by phoropter 3001 locally or via a remote server or database 3059.

Once the correct dioptric power needed to correct for the patient's reduced visual acuity is defined at step 3620, an eye prescription or vision correction parameter(s) may be derived from the total dioptric power used to display the best perceived optotypes.

In some embodiments, the patient, an optometrist or other eye-care professional may be able to transfer the patient's eye prescription directly and securely to his/her user profile store on said server or database 3059. This may be done via a secure website, for example, so that the new prescription information is automatically uploaded to the secure user profile on remote database 3059. In some embodiments, the eye prescription may be sent remotely to a lens specialist or similar to have prescription glasses prepared.

In some embodiments, the vision testing system 3000 may also or alternatively be used to simulate compensation for higher-order aberrations. Indeed, the light field rendering methods 1100 and 1900 described above may be used to compensation for higher order aberrations (HOA), and thus be used to validate externally measured or tested HOA via method 3600, in that a measured, estimated or predicted HOA can be dynamically compensated for using the system described herein and thus subjectively visually validated by the viewer in confirming whether the applied HOA correction satisfactory addresses otherwise experienced vision deficiencies. In one such embodiment, a HOA correction preview can be rendered, for example, in enabling users to appreciate the impact HOA correction (e.g. HOA compensating eyewear or contact lenses, intraocular lenses (IOL), surgical procedures, etc.), or different levels or precisions thereof, could have on their visual acuity. Alternatively, HOA corrections once validated can be applied on demand to provide enhanced vision correction capabilities to consumer displays.

Higher-order aberrations can be defined in terms of Zernike polynomials, and their associated coefficients. In some embodiments, the light field phoropter may be operable to help validate or confirm measured higher-order aberrations, or again to provide a preview of how certain HOA corrections may lead to different degrees of improved vision. To do so, in some embodiments, the ray-tracing methods 1100 and 1900 may be modified to account for the wavefront distortion causing the HOA which are characterized by a given set of values of the Zernike coefficients. Such an approach may include, in some embodiments, extracting or deriving a set of light rays corresponding to a given wavefront geometry. Thus, the light field display may be operable to compensate for the distortion by generating an image corresponding to an "opposite" wavefront aberration. In some embodiments, the corresponding total aberration values may be normalized for a given pupil size of circular shape. Moreover, in some embodiments, the wavefront may be scaled, rotated and transformed to account for the size and shape of the view zones. This may include concentric scaling, translation of pupil center, and rotation of the pupil, for example.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A device operable to dynamically adjust user perception of an input image, the device comprising:
an array of digital display pixels;
a vibrating light field shaping layer (LFSL) comprising a corresponding array of light field shaping elements (LFSEs) shaping a light field emanating from said pixels and operatively disposed to vibrate relative to said digital display pixels; and
a digital processor operable on pixel data for the input image to output adjusted image pixel data to be rendered via said LFSEs to adjust user perception of the input image as rendered therethrough by:
for at least some of said pixels, digitally:
projecting an adjusted ray trace linking a given pixel and a pupil location given a corresponding LFSE, to intersect an adjusted image plane at a given adjusted image plane location, wherein said adjusted image plane is designated to provide a designated image perception adjustment; and
associating an adjusted pixel value designated for said given adjusted plane location with said given pixel; and
rendering each said given pixel according to said adjusted pixel value, thereby rendering a perceptively adjusted version of the input;
wherein said vibrating LFSL is disposed to vibrate in a plane thereof relative to said array of digital display pixels;
wherein said vibrating LFSL comprises at least one of a microlens array or a parallax barrier;
wherein the device further comprises an actuator operable to vibrate said LFSL relative to said digital display pixels;
wherein said actuator is operable to vibrate said LFSL according to a predictable oscillatory motion relative to said digital display pixels; and
wherein said digital processor is operable to synchronize said associating of said adjusted pixel value with each said given pixel with said predictable oscillatory motion to control an optical output by each said given pixel to predictably interface with said corresponding LFSE as said LFSL vibrates.

2. The device of claim 1, wherein said adjusted image plane corresponds to a designated vision correction parameter associated with a given visual acuity level such that said perceptively adjusted version of the input at least partially accommodates for said given visual acuity level; and wherein said digital processor is further operable to adjust said designated vision correction parameter to accommodate for a distinct visual acuity level until an optimal visual acuity level is identified.

3. The device of claim 2, wherein the device is a subjective eye testing device.

4. The device of claim 1, wherein said adjusted image plane corresponds to a designated vision correction parameter associated with a given visual acuity level such that said perceptively adjusted version of the input at least partially accommodates for said given visual acuity level.

5. The device of claim 1, wherein said vibrating LFSL comprises one of a linearly vibrating LFSL, a circularly vibrating LFSL or an elliptically vibrating LFSL.

6. The device of claim 1, wherein said actuator comprises at least one of a piezoelectric transducer or an ultrasonic motor.

7. The device of claim 1, wherein said actuator is operable to vibrate said LFSL according to a predictable oscillatory motion relative to said digital display pixels; and wherein said digital processor is operable to execute said projecting as a function of a known position of said corresponding LFSE given said predictable oscillatory motion.

8. The device of claim 7, wherein said known position is one of an average or central position given said predictable oscillatory motion; an actual position at a given time based on said predictable oscillatory motion, or one of four cyclically recurring discrete positions in a circularly-defined oscillation.

9. The device of claim 7, wherein a frequency of said predictable oscillatory motion is synchronized to an image refresh rate.

10. The device of claim 1, wherein a total number of given pixels interfacing with any said corresponding LFSE to ultimately intersect said pupil location is increased due to said vibrating array of LFSEs.

11. The device of claim 10, wherein said increased number results in an increased brightness.

12. The device of claim 10, wherein said increased number results in an increased resolution.

13. The device of claim 1, wherein a total number of given pixels interfacing with any said corresponding LFSE to ultimately intersect said pupil location is increased during any given vibration cycle and is defined at least in part by an optical LFSE parameter and a vibration amplitude of said array of LFSEs.

* * * * *